(12) United States Patent  
Crotty, III et al.

(10) Patent No.: US 6,669,262 B1
(45) Date of Patent: Dec. 30, 2003

(54) CLIP LOCK VISOR

(75) Inventors: Willard E. Crotty, III, Quincy, MI (US); James (Jud) Hobson, Jonesville, MI (US); Glenn Snyder, Quincy, MI (US); Mark Tom, Coldwater, MI (US)

(73) Assignee: Crotty Corporation, Quincy, MI (US)

( * ) Notice: Subject to any disclaimer, the term of this patent is extended or adjusted under 35 U.S.C. 154(b) by 0 days.

(21) Appl. No.: 10/010,137

(22) Filed: Dec. 6, 2001

Related U.S. Application Data

(63) Continuation-in-part of application No. 09/788,241, filed on Feb. 16, 2001.

(51) Int. Cl.[7] .................................................. B60J 3/00
(52) U.S. Cl. ...................... 296/97.1; 296/97.5; 296/97.2
(58) Field of Search ............................... 296/97.1, 97.5, 296/97.9, 97.8, 97.12; 2/10, 12; 29/91, 91.1, 91.7, 91.6; 52/716.3

(56) References Cited

U.S. PATENT DOCUMENTS

| | | | | |
|---|---|---|---|---|
| 4,491,256 A | * | 1/1985 | Payne et al. .................. 223/24 |
| 4,570,990 A | * | 2/1986 | Flowerday ................. 296/97.1 |
| 4,763,946 A | * | 8/1988 | Robbins et al. ............ 296/97.1 |
| 4,988,140 A | * | 1/1991 | Van Order ................. 296/97.5 |
| 4,998,765 A | * | 3/1991 | Van Order et al. ........ 296/97.1 |
| 4,998,767 A | * | 3/1991 | Lawassani et al. ........ 296/97.1 |
| 5,131,711 A | * | 7/1992 | Laferle ...................... 296/97.1 |
| 5,205,639 A | * | 4/1993 | White et al. ............... 296/97.2 |
| 5,295,725 A | * | 3/1994 | Jones ........................ 296/97.1 |
| 5,308,136 A | * | 5/1994 | Schwarz et al. ........... 296/97.1 |
| 5,336,460 A | | 8/1994 | Hettinga ..................... 264/251 |
| 5,338,082 A | * | 8/1994 | Miller ....................... 296/97.1 |
| 5,365,416 A | * | 11/1994 | Peterson ................... 296/97.5 |
| 5,454,616 A | * | 10/1995 | Aymerich et al. ......... 296/97.1 |
| 5,466,405 A | * | 11/1995 | Viertel et al. .............. 264/45.4 |
| 5,556,154 A | * | 9/1996 | Vaxelaire .................. 296/97.1 |
| 5,580,118 A | | 12/1996 | Crotty, III ............... 296/97.12 |
| 5,678,879 A | * | 10/1997 | Mailander et al. ........ 296/97.1 |
| 5,716,092 A | * | 2/1998 | Dellinger et al. .......... 296/97.1 |
| 5,762,852 A | | 6/1998 | Hettinga ..................... 264/251 |
| 5,779,298 A | * | 7/1998 | Smelser et al. ............ 296/97.1 |
| 5,887,933 A | | 3/1999 | Peterson .................... 296/97.1 |
| 5,975,616 A | * | 11/1999 | Eple et al. ................. 296/97.1 |
| 6,033,005 A | * | 3/2000 | Crotty, III ................. 296/97.1 |
| 6,254,168 B1 | * | 7/2001 | Crotty, III ................. 296/97.1 |
| 6,302,467 B1 | * | 10/2001 | Crotty et al. .............. 296/97.1 |
| 6,409,245 B1 | * | 6/2002 | Crotty et al. .............. 296/97.1 |
| 2002/0113454 A1 | * | 8/2002 | Crotty et al. .............. 296/97.1 |

FOREIGN PATENT DOCUMENTS

| | | | |
|---|---|---|---|
| EP | 0 556724 | * | 8/1993 |
| EP | 0 562 085 | * | 9/1993 |
| EP | 0 612636 | * | 8/1994 |
| JP | 1-226421 | * | 9/1989 |

OTHER PUBLICATIONS

Article entitled 3M VHB™ Double Coated Acrylic Foam Tapes and Adhesive Transfer Tapes; Supercedes Aug. 1994; published by 3M Bonding Systems Division.

* cited by examiner

*Primary Examiner*—Kiran Patel
(74) *Attorney, Agent, or Firm*—Rader, Fishman & Grauer, PLLC

(57) ABSTRACT

A sun visor, which generally includes a foundation which may be folded unto itself to form two foundation halves, and an upholstery cover disposed over the foundation, the foundation halves include connecting elements which engage one another to secure the foundation halves together. Additionally, a frame member may be disposed between the folded foundation halves, the frame member including connecting elements which engage corresponding connecting elements of the foundation halves to secure the foundation halves to the frame member. The foundation halves include a liner board and a bead member section. The bead member section is secured to the outer edge of the liner board with a liner board interlocking mechanism which prevents the liner board and the bead member section from separating. A cover retention assembly is associated with each of the foundation halves and engages the ends of the upholstery cover to secure the cover to the sun visor foundation.

10 Claims, 23 Drawing Sheets

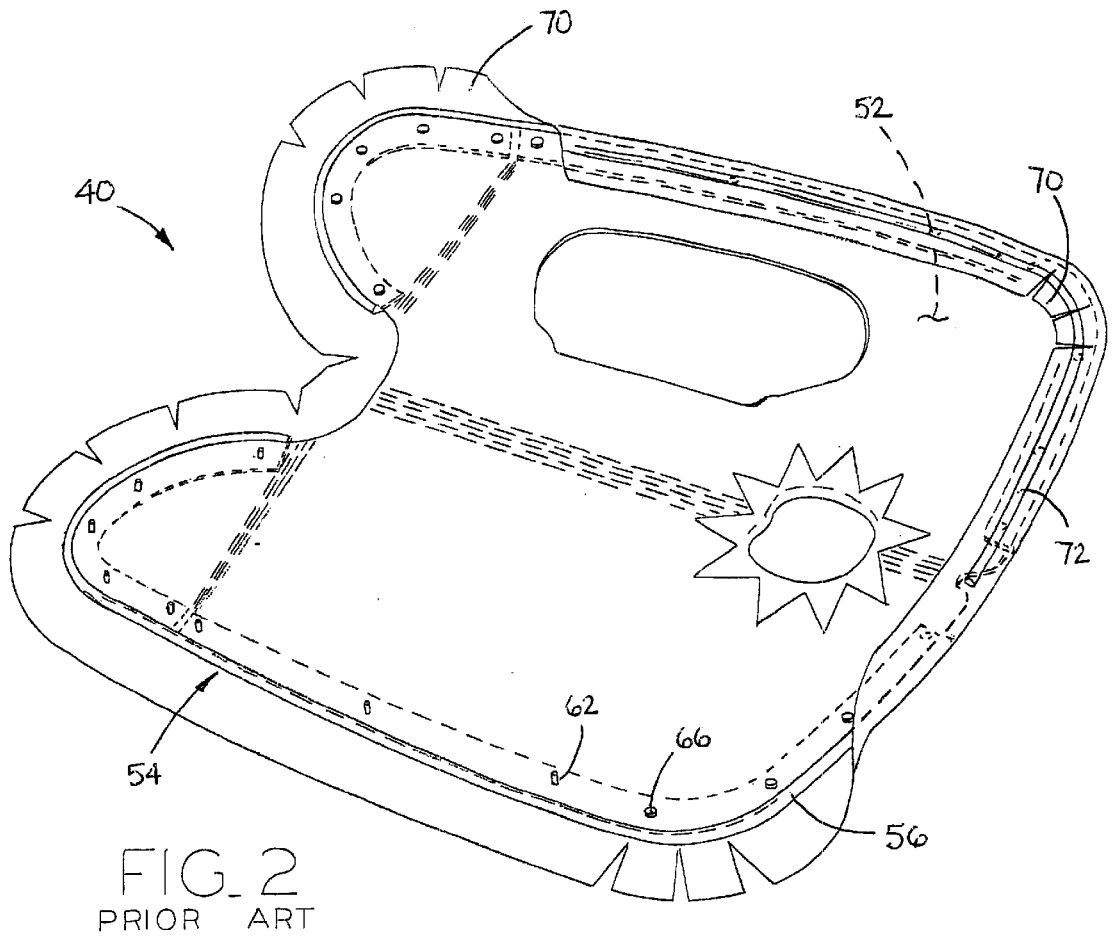
FIG_2 PRIOR ART
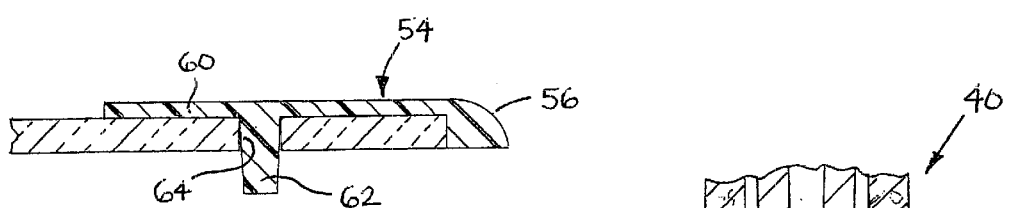
FIG_3 PRIOR ART
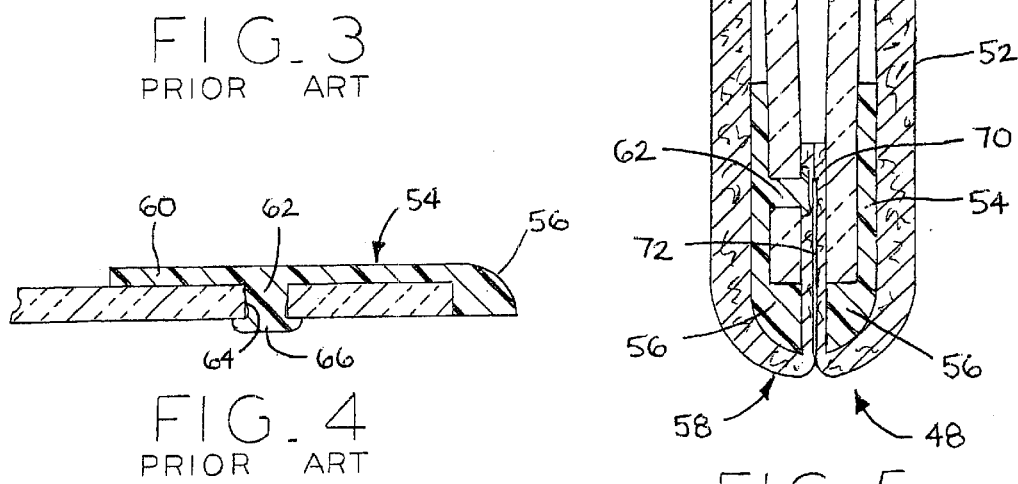
FIG_4 PRIOR ART
FIG_5 PRIOR ART

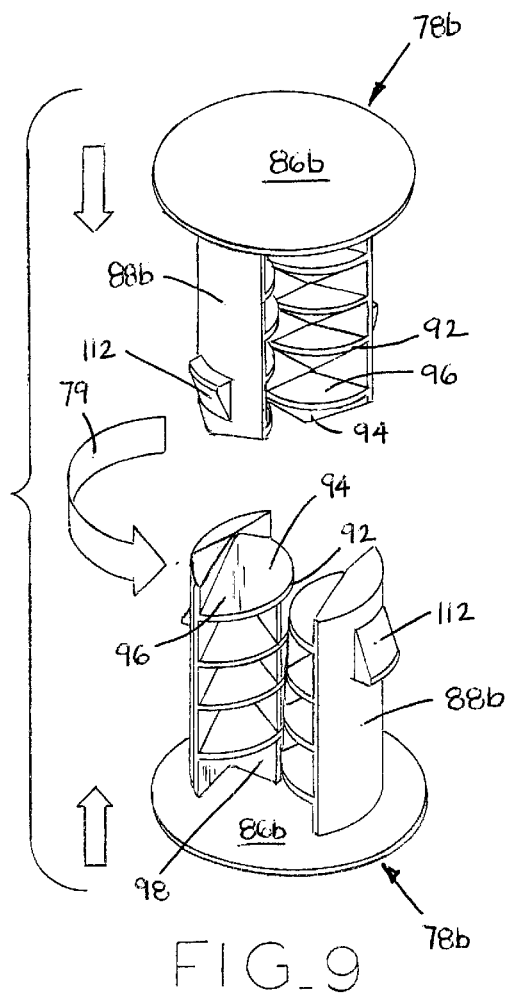
FIG_9
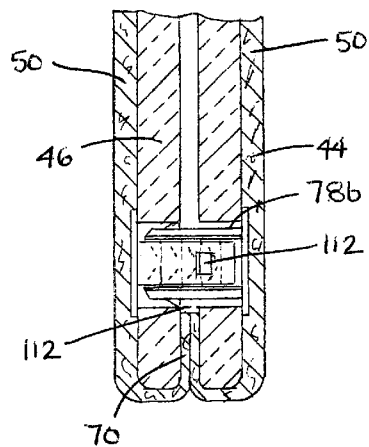
FIG_11
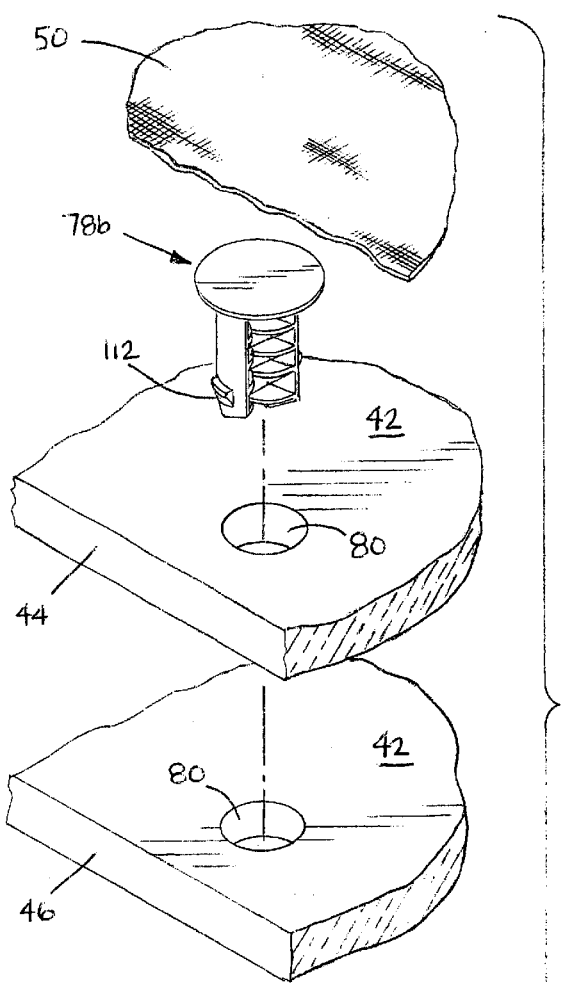
FIG_10

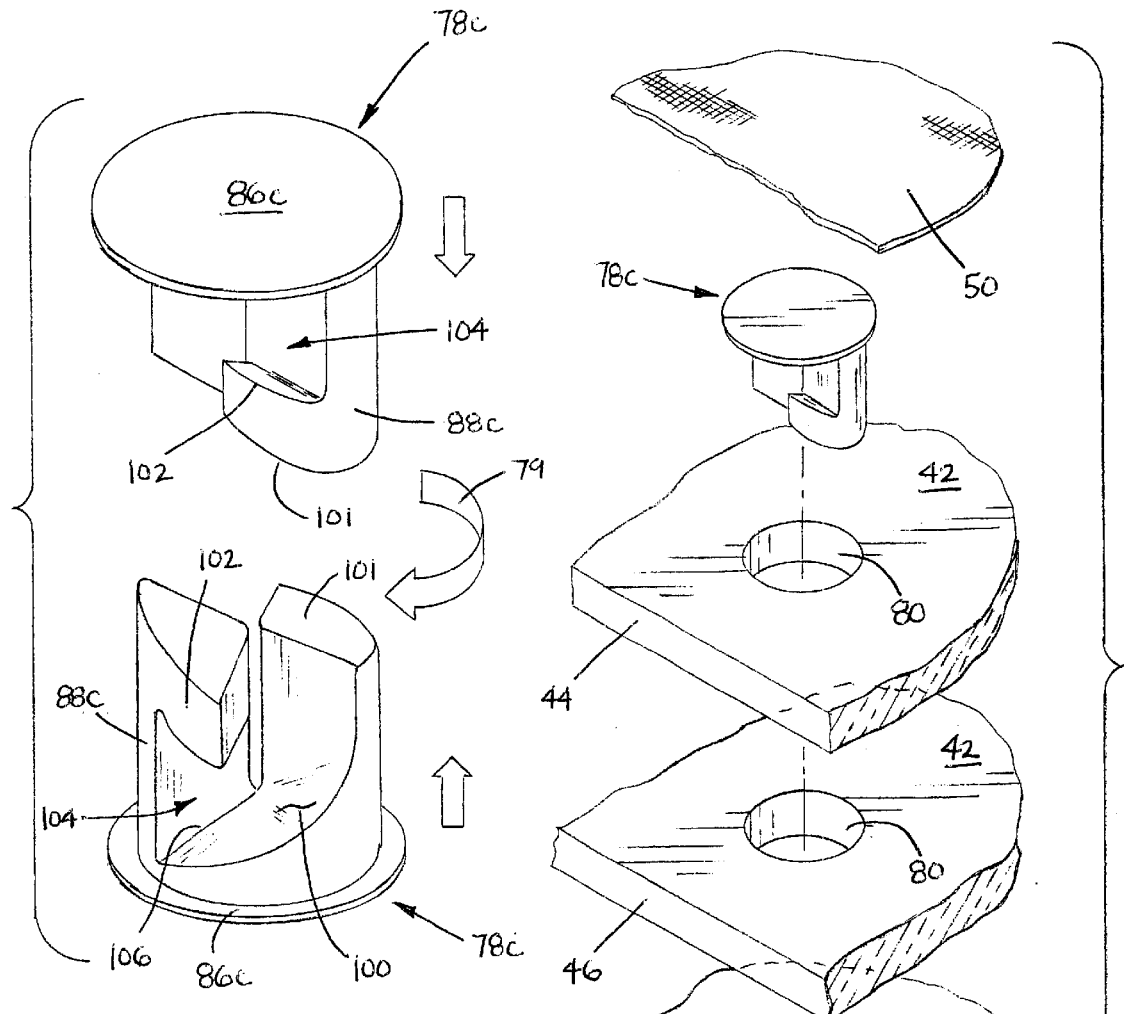
FIG. 14
FIG. 15
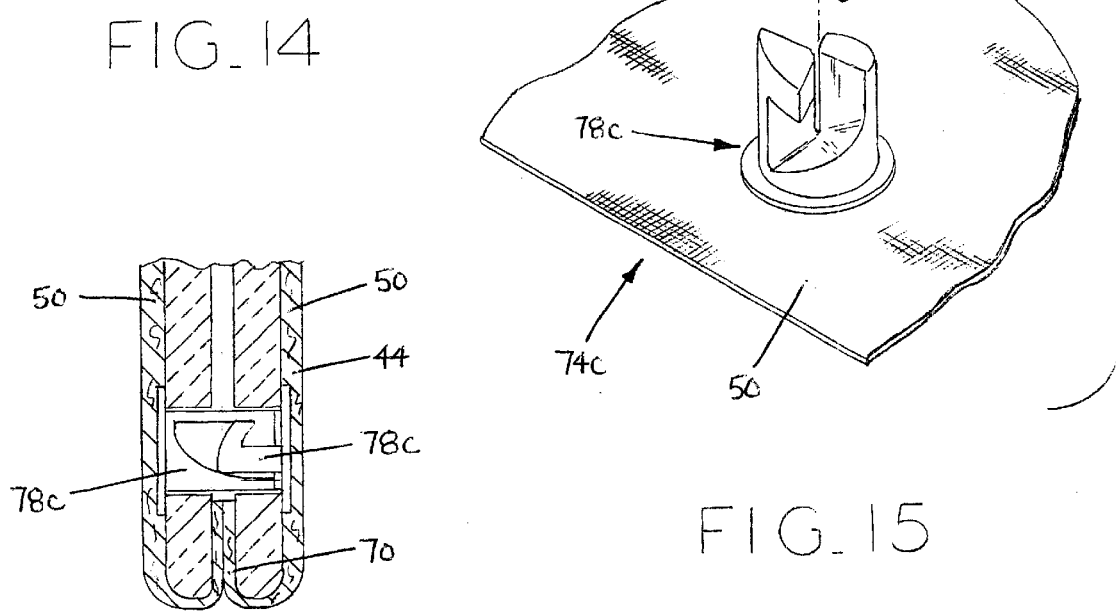
FIG. 16

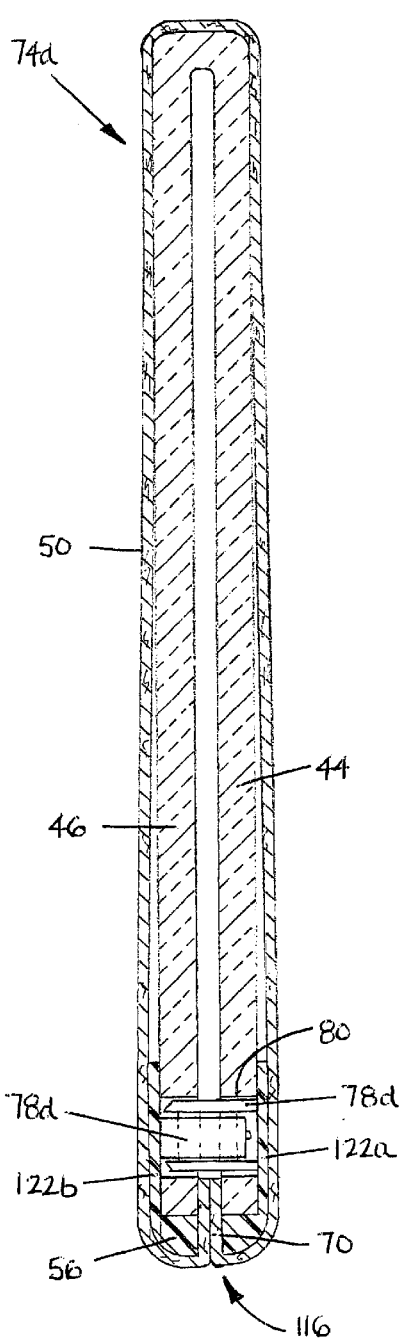
FIG_21
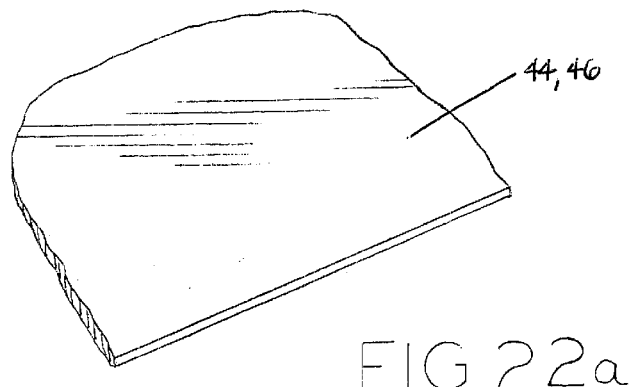
FIG_22a
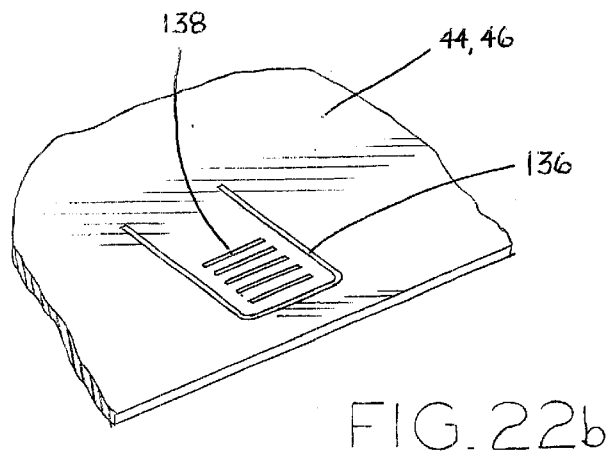
FIG_22b
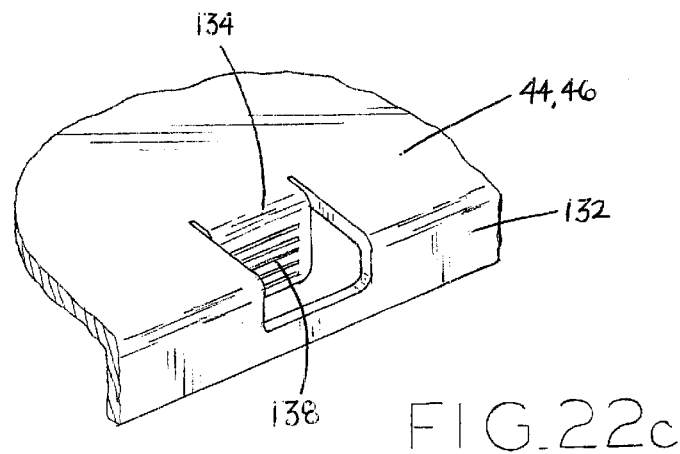
FIG_22c

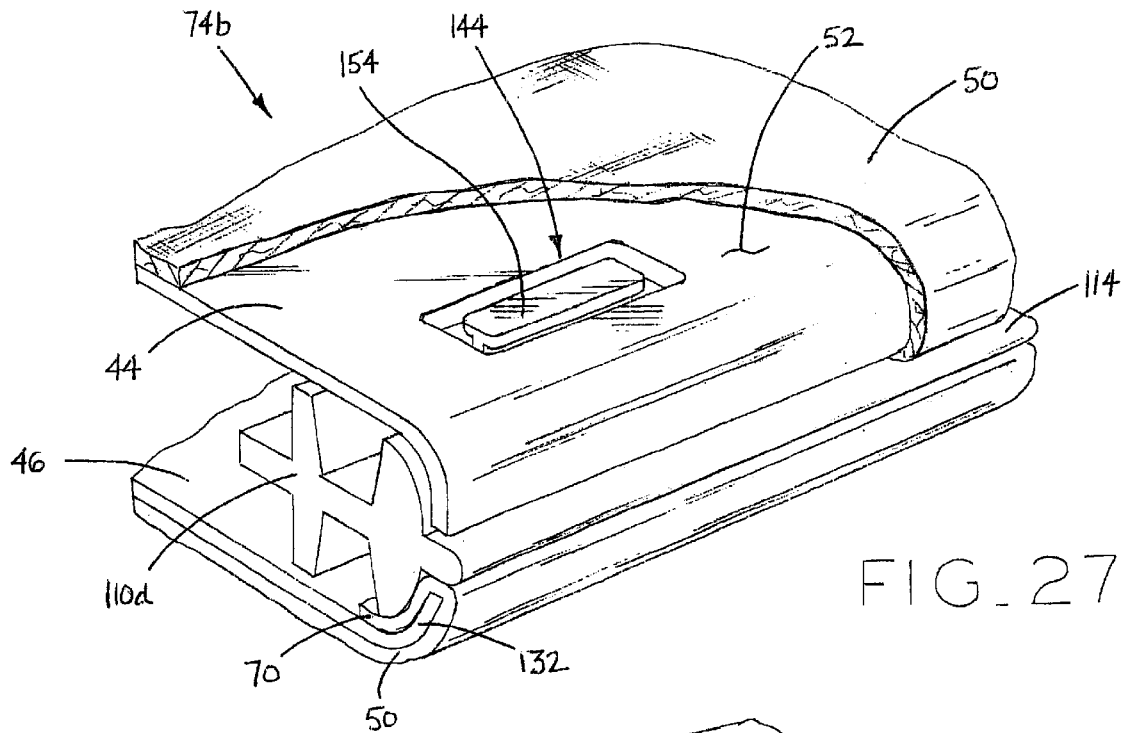
FIG_27
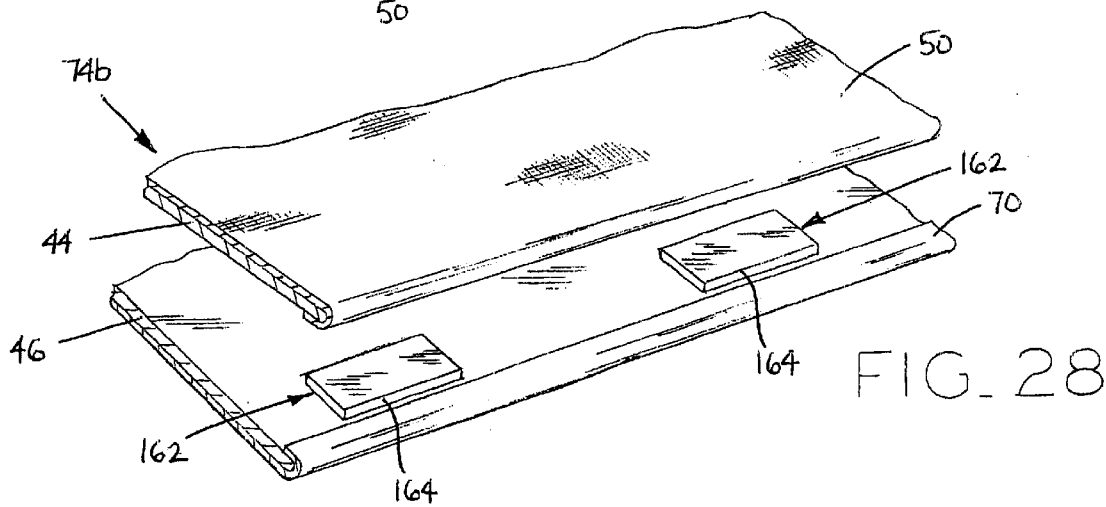
FIG_28
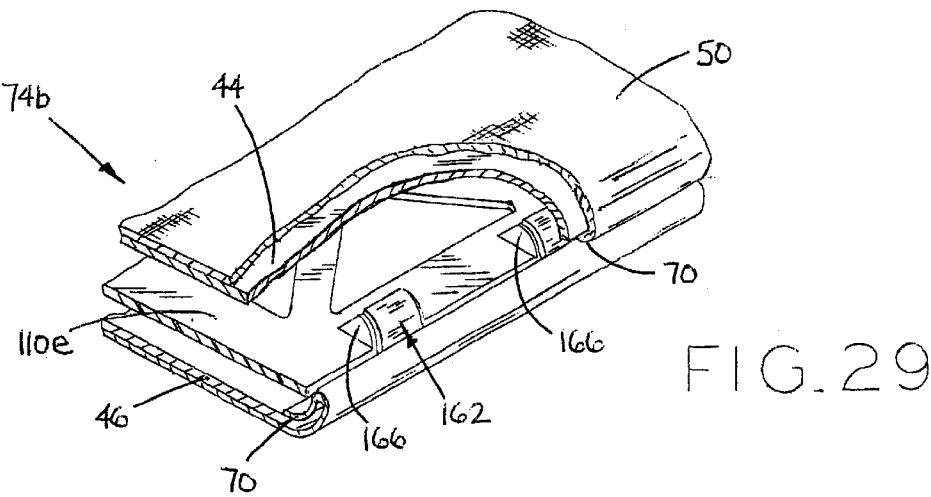
FIG_29

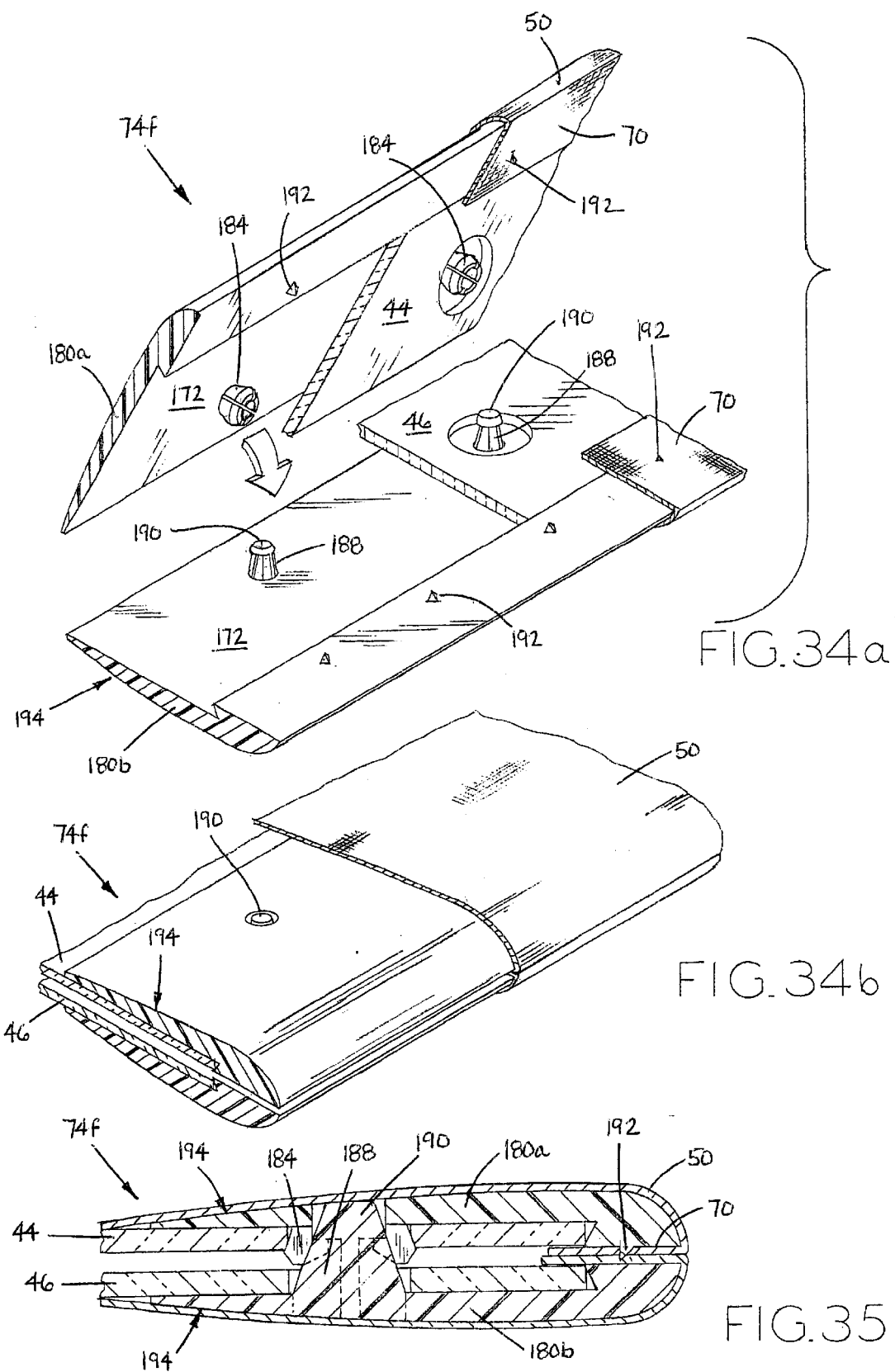

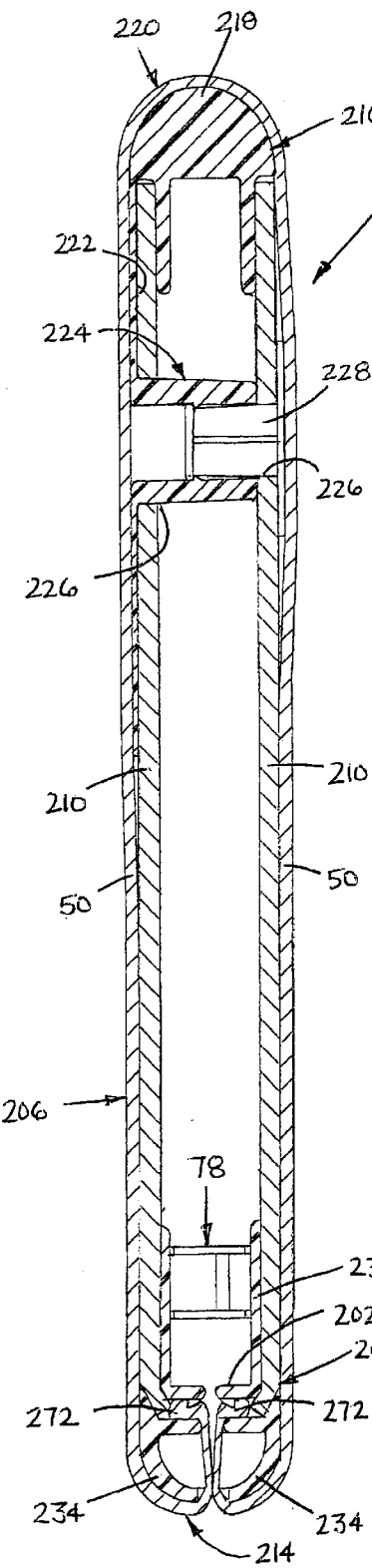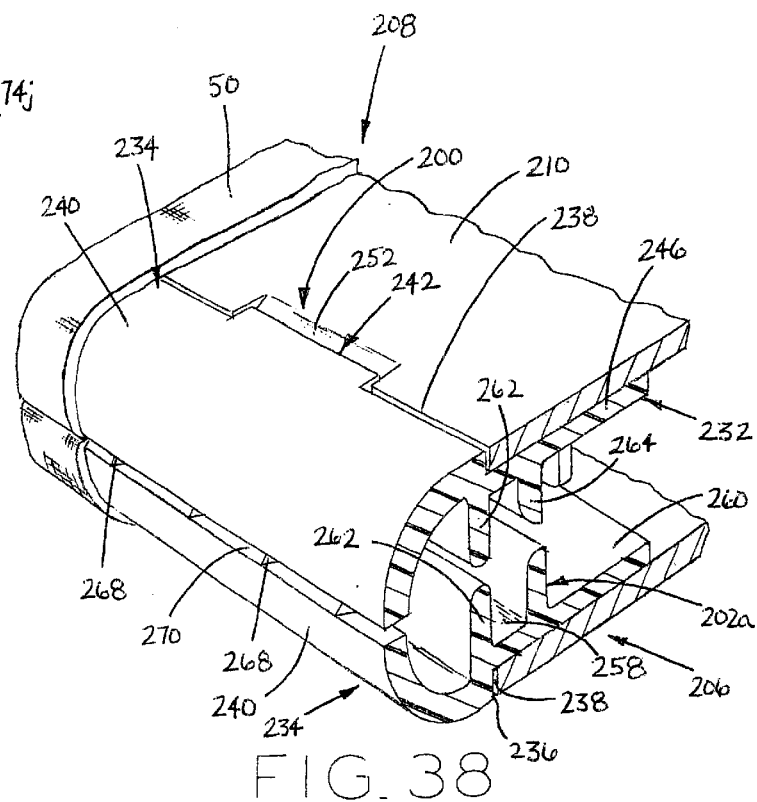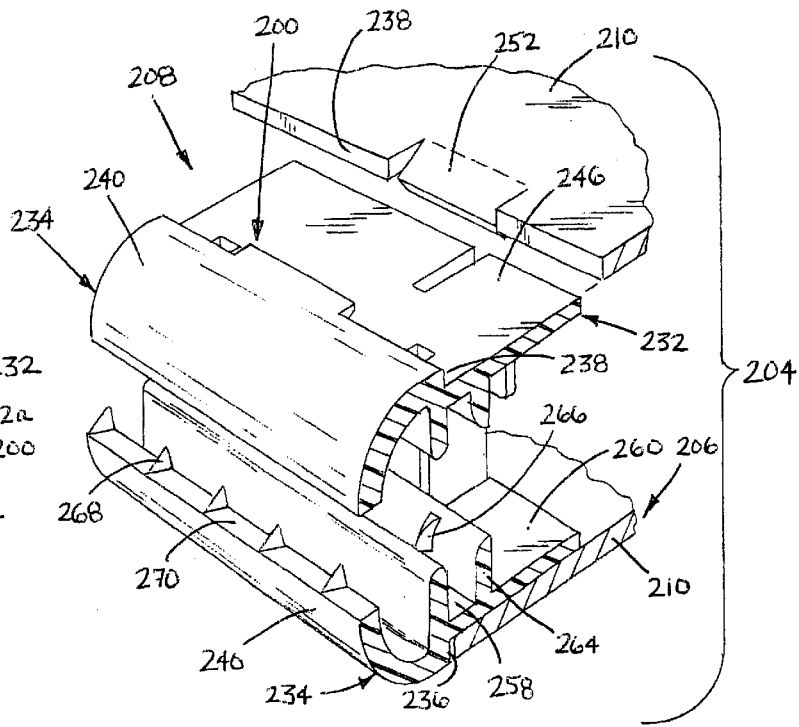

CLIP LOCK VISOR

CROSS REFERENCE TO RELATED APPLICATIONS

This application is a Continuation-in-part of U.S. application Ser. No. 09/788,241 entitled CLIP LOCK VISOR, filed Feb. 16, 2001 U.S. Pat. No. 6,527,328, issued Mar. 4, 2003.

BACKGROUND OF THE INVENTION

1. Field of the Invention

The present invention relates generally to sun visors for vehicles, the sun visors of the type which include an outer covering which folds unto itself. In particular, the present invention relates to the manner in which the folded halves of such outer coverings are attached to one another during assembly of the sun visor.

2. Description of the Related Art

A prior sun visor design is disclosed in U.S. Pat. No. 6,302,467, issued on Oct. 16, 2001, assigned to the assignee of the present application, the disclosure of which is hereby incorporated by reference. The sun visor disclosed in the '467 patent generally includes an outer upholstery cover and a foundation, in which the foundation folds unto itself and is covered by the outer upholstery cover. A pair of bead member sections, each having a bulbous bead portion therearound which corresponds to the edge of the sun visor, are attached to the foundation, and edges of the upholstery cover are tucked into the interior of the sun visor and secured thereto with adhesive. Finally, adhesive is applied around the interior edges of the foundation, and the foundation is folded unto itself to define two foundation halves which are secured to one another by the adhesive to complete the assembly of the sun visor, with the bulbous head portions of the bead member sections together defining a rounded edge around the periphery of the sun visor.

The foregoing sun visor may be manufactured using an automated process including several individual assembly steps. In one such step, the bead member sections are attached to the foundation such that stakes projecting from the bead member sections protrude through receiving holes in the foundation. The stakes are then heat fused, such that the heads of the stakes deform and flatten to secure the bead member sections to the foundation. The upholstery cover is then attached to the foundation such that peripheral edges of the upholstery cover fold around the edges of the foundation and are secured to the foundation by adhesive.

Next, the sun visor is securely held in a predefined, exact position by a clamping apparatus as an automatic adhesive application head follows a predetermined, computer-controlled path to apply a beading of liquid adhesive around the edges of the foundation. Thereafter, the foundation is folded unto itself in a folding jig which subsequently holds the foundation halves together under pressure for a predetermined amount of time to allow the adhesive to set to complete the assembly of the sun visor.

Although the above-described sun visor design has proven successful, manufacturing the sun visor requires many individual assembly steps, as described above, with each step requiring expensive and complex machinery. The adhesive itself, which is used to secure the sun visor components together, is also rather expensive. In addition, the difficulty of re-tooling the automated process to manufacture different visor designs increases with the complexity and number of automated assembly steps.

What is needed is a sun visor which is both easier and less expensive to manufacture than the above-described sun visor, yet which provides a secure and durable connection between the components of the sun visor foundation halves and the foundation halves themselves, and which eliminates the need for adhesive to secure the upholstery cover to the foundation.

SUMMARY OF THE INVENTION

The present invention provides a sun visor, the sun visor generally including a foundation which may be folded unto itself to form two foundation halves, and an upholstery cover disposed over the foundation, where the foundation halves include connecting elements which engage one another to secure the foundation halves together. A frame member may be disposed between the folded foundation halves, the frame member including connecting elements which engage corresponding connecting elements of the foundation halves to secure the foundation halves to the frame member.

The connecting elements may be, for example, a plurality of clips associated with each foundation half, such that when the foundation halves are pressed together, corresponding clips engage one another to secure the foundation halves together with a snap lock connection. The clips may be disposed and retained within apertures in the foundation halves. Optionally, the foundation halves may include recesses in the external surfaces thereof around each aperture, the recesses receiving the heads of the clips such that the external surfaces of the foundation halves are substantially flush with the heads of the clips to allow the upholstery cover to uniformly cover the foundation halves and hide the clips from view.

The connecting elements may include a single connecting strip, or a pair of connecting strips, which are respectively associated with the foundation halves and include a plurality of clips formed therewith, with the clips of the pair of connecting strips engaging one another when the foundation halves are pressed together to secure the foundation halves together. Rather than clips, the connecting strips may optionally include a plurality of engaging rachet legs, or a plurality of posts formed with one connecting strip which engage a corresponding plurality of locking fingers of another connecting strip.

Additionally, a frame member may be disposed between the foundation halves, the frame member including a plurality of apertures therein through which the clips extend to engage one another to secure the foundation halves together, with the frame member sandwiched between the foundation halves. Alternatively, the frame member may include a plurality of clip receptacles alternatingly disposed in opposite sides thereof, with the clips of the foundation halves engaging the clip receptacles to secure the foundation halves to the frame member. The frame member may optionally include a rounded beading disposed externally of the foundation halves and the upholstery cover, the rounded beading forming an edge portion of the sun visor.

In addition to interlocking clips, the present invention provides interlocking systems to secure the foundation halves of the sun visor together. For example, the sun visor may include a frame member having a plurality of slots on opposite sides of the frame member, the foundation halves including a plurality of integrally formed tabs which are received within the slots of the frame member to lock the foundation halves to opposite sides of frame member. Alternatively, the frame member may include a plurality of T-shaped tabs extending from opposite sides thereof, and the foundation halves may include a plurality of recessed cavities formed therein which include slots, the T-shaped tabs slidingly received within the slots to secure the foundation halves to opposite sides of the frame member.

Additionally, adhesive strips may be used to secure the foundation halves of the sun visor together, the adhesive strips having exposed adhesive on opposite sides thereof. The adhesive strips may be sandwiched between the foundation halves to directly secure the foundation halves together, or may be sandwiched between each foundation half and a frame member to secure the foundation halves to the frame member.

Additionally, the foundation halves may include a cardboard liner board having a bead member section located about the outer edge thereof defining the rounded periphery of the sun visor. The connecting elements may be integrally formed with the bead member sections of the foundation halves. Also integrally formed with the bead member sections are a liner board interlocking mechanism and an upholstery cover retention assembly.

The liner board interlocking mechanism includes a catch which may be shaped in any one of a plurality of shapes. The catch is designed to engage a corresponding notch in the edge of the liner board. The liner board is forced into contact with the bead member section, and the edges of the notch in the liner board are depressed under the edge of the catch. This prevents the liner board from lifting up and separating from the bead member section.

The upholstery cover retention assembly may include a plurality of barbs for engaging the upholstery cover as it is wrapped around the bead member sections and the remainder of the sun visor assembly. The bead member sections also include a retention channel for securing the edge of the upholstery cover. The upholstery cover is stretched over and engaged by barbs disposed on the external surface of the bead member sections. An edge of the upholstery cover is manually pressed into the channel with an installation tool, and the upholstery cover is secured within the channel by a barb disposed within the channel.

Alternatively, a catch may be formed with the bead member sections rather than the channel. The catch may have at least one barb formed thereon for engaging the upholstery cover and securing the upholstery cover to the bead member section. During the visor assembly process, the bead member sections depress one another, such that they cause the upholstery cover to be pulled inward. It is contemplated that the bead member sections could be spring biased.

Advantageously, the various interlocking connections between the foundation halves, or between the foundation halves and the frame member, obviate the use of expensive adhesive to secure the foundation halves together, thereby reducing the cost and difficulty of manufacturing the sun visor. Also, the interlocking foundation halves of the sun visor may be secured to one another in a single step, thereby eliminating several of the above-described assembly steps associated with heat staking, adhesive application, and holding the folded foundation halves together under pressure to allow the adhesive to cure.

Similarly, the adhesive strips also reduce the cost and difficulty of manufacturing the sun visor by obviating the use of a liquid adhesive which must be mechanically applied, after which the sun visor is held under pressure for the adhesive to set.

Further, the liner board interlocking mechanism allows for a secure connection between the liner board and the bead member section, thereby preventing separation of the foundation half components. The interlocking mechanism eliminates the use of adhesive to secure the liner board to the bead member section.

Additionally, the upholstery cover retention assembly effectively secures the upholstery cover to the foundation halves without sagging or wrinkling of the upholstery cover. The retention assembly also eliminates the assembly steps of using adhesive to affix the upholstery cover to the foundation, preventing the upholstery cover from separating from the sun visor foundation if the adhesive should fail.

The sun visor of the present invention may therefore be assembled using an automated manufacturing process which is less complex and expensive than the prior process.

The present invention provides a sun visor comprising a substantially flat foundation folded unto itself to form two foundation halves. A cover is disposed over the foundation forming an exterior surface of the sun visor. At least one connecting element is associated with each foundation half, and corresponding connecting elements of the two foundation halves engage one another to secure the foundation halves together. A retention assembly is associated with the foundation to secure the cover to the foundation.

The present invention also provides a sun visor comprising a substantially flat foundation folded unto itself to form two foundation halves. The foundation includes an end member and a liner board. A cover is disposed over the foundation forming an exterior surface of the sun visor. At least one connecting element is associated with each foundation half, and corresponding connecting elements of the two foundation halves engage one another to secure the foundation halves together. A liner board interlocking mechanism is associated with the end member to secure the liner board to the end member.

The present invention provides a sun visor comprising a substantially flat foundation folded unto itself to form two foundation halves. The foundation includes an end member and a liner board. A cover is disposed over the foundation forming an exterior surface of the sun visor. At least one connecting element is associated with each foundation half, and corresponding connecting elements of the two foundation halves engage one another to secure the foundation halves together. A cover retention assembly is associated with the end member to secure the cover to the end member. A liner board interlocking mechanism is also associated with the end member to secure the liner board to the end member.

The present invention further provides a method of assembling a sun visor having a foundation with two halves. The method includes securing a liner board to each of the foundation halves; engaging one end of a cover in a retention assembly associated with one of the foundation halves; wrapping the foundation with the cover; engaging a second end of the cover in the retention assembly associated with the second of the foundation halves; and connecting one of the foundation halves to the second of the foundation halves.

BRIEF DESCRIPTION OF THE DRAWINGS

The above-mentioned and other features and advantages of this invention, and the manner of attaining them, will become more apparent and the invention itself will be better understood by reference to the following description of embodiments of the invention taken in conjunction with the accompanying drawings, wherein:

FIG. 2 is a perspective view of the sun visor assembly of FIG. 1, shown with only part of the upholstery cover folded over the edge of the foundation to illustrate the heat stake attachment of the bead member sections to the foundation, wherein only some of the stakes are fused to the foundation;

FIG. 3 is a fragmentary sectional view showing a bead member section associated with the foundation prior to heat stake fusion;

FIG. 4 is a fragmentary sectional view showing a bead member section secured to the foundation after heat stake fusion;

FIG. 5 is a fragmentary sectional view of the assembled sun visor assembly of FIGS. 1 and 2;

FIG. 9 is a perspective view of connecting elements, shown as a pair of second clips, being pressed together into engagement;

FIG. 10 is a fragmentary exploded view of an another sun visor assembly of the present invention, showing the clips of FIG. 9, the foundation halves, and the upholstery cover;

FIG. 11 is a fragmentary sectional view of the assembled sun visor assembly of FIG. 10;

FIG. 14 is a perspective view of connecting elements, shown as a pair of third clips, being pressed together into engagement;

FIG. 15 is a fragmentary exploded view of an another sun visor assembly of the present invention, showing the clips of FIG. 14, the foundation halves, and the upholstery cover;

FIG. 16 is a fragmentary sectional view of the assembled sun visor assembly of FIG. 15;

FIG. 21 is a sectional view of the assembled sun visor assembly of FIG. 20;

FIG. 22a is a fragmentary perspective view of a foundation half of another sun visor assembly of the present invention;

FIG. 22b is a fragmentary perspective view of the foundation half of FIG. 22a, shown with a tab outline and a plurality of recessed notches formed therein;

FIG. 22c is a fragmentary perspective view of the foundation half of FIG. 22b, the foundation half including a bent edge portion and a depending tab;

FIG. 27 is a fragmentary view of a sun visor assembly including the foundation halves of FIG. 25 connected to the frame member of FIG. 26;

FIG. 28 is a fragmentary view of a further sun visor assembly of the present invention, showing a pair foundation halves which are secured to one another by adhesive strips;

FIG. 29 is a fragmentary view of a further sun visor assembly of the present invention, showing a pair foundation halves which are each secured to a frame member by strips;

FIG. 34a is a fragmentary view of a further sun visor assembly of the present invention, showing a pair of third connecting strips associated with a pair of foundation halves and an upholstery cover covering the foundation halves, the foundation halves being pressed together;

FIG. 34b is a fragmentary view of the assembled sun visor assembly of FIG. 34a;

FIG. 35 is a fragmentary sectional view of the assembled sun visor assembly of FIG. 34b;

FIG. 37 is a sectional view of the assembled sun visor along line 37—37 of FIG. 36;

FIG. 38 is a fragmentary perspective view of the foundation of the sun visor assembly of FIG. 36;

FIG. 39 is an exploded perspective view of the foundation of the sun visor assembly of FIG. 38;

Figure 1:
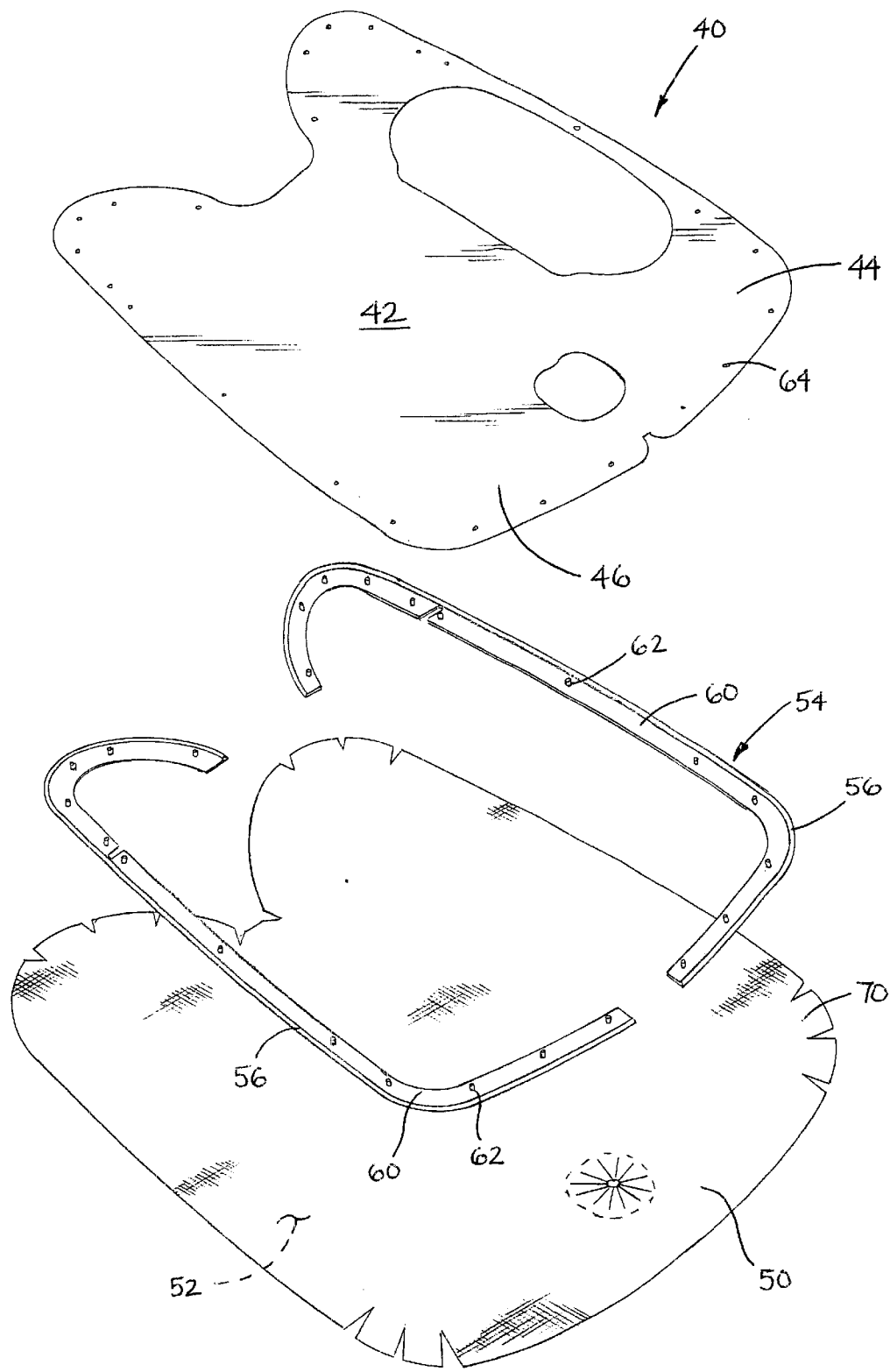
FIG. 1 is an exploded perspective view of a prior art sun visor assembly, including the foundation, upholstery cover, and bead member sections.

Corresponding reference characters indicate corresponding parts throughout the several views. The exemplifications set out herein illustrate preferred embodiments of the invention, in several forms, and such exemplifications are not to be construed as limiting the scope of the invention in any manner.

DETAILED DESCRIPTION

Referring to FIGS. 1–5, a prior sun visor assembly 40 is shown, including a substantially flat foundation 42 which may be folded unto itself to form two foundation halves 44, 46 (shown unfolded in FIGS. 1 and 2). Foundation halves 44, 46 have corresponding shapes that, when folded together, define edge 48 of sun visor assembly 40, as shown in FIG. 5. Upholstery cover 50 covers foundation 42 and forms an exterior surface 52 of visor assembly 40. Visor assembly 40 additionally includes bead member sections 54 having bulbous portions 56 which, when pressed together when foundation halves 44, 46 are secured to one another as shown in FIG. 5, form bead member 58 which partially defines edge 48 of the sun visor. Bead member sections 54 additionally include stems 60 having a plurality of stakes 62 extending therefrom, which fit through corresponding apertures 64 formed in foundation 42. FIG. 3 illustrates a stake 62 prior to heat stake fusion, with stake 62 extending through aperture 64 in foundation 42. Stakes 62 are formed of a plastic material, such as polypropylene or ABS plastic, which melts and deforms during heat staking, as shown in FIG. 4, forming cap 66 that locks stem 60 of bead member section 54 against foundation 42 to secure bead member section 54 to foundation 42.

After stakes 62 have been fused to secure bead member sections 54 to foundation 42, foundation 42 is placed upon upholstery cover 50, and edge portions 70 of upholstery cover 50 are wrapped around the edges of foundation 42 and attached to the interior periphery of foundation 42 using an adhesive. A beading of adhesive 72 is then applied around the interior edge of foundation 42, and foundation 42 is folded unto itself to form two foundation halves 44, 46 secured to one another by adhesive 72, as described above.

Exemplary embodiments of sun visors of the present invention are shown in FIGS. 6–35, which sun visors include connecting elements for securing the foundation halves of the sun visor to one another, or alternatively, include a frame member which is disposed between the foundation halves and which includes connecting elements for securing the foundation halves to the frame member.

Figure 8:
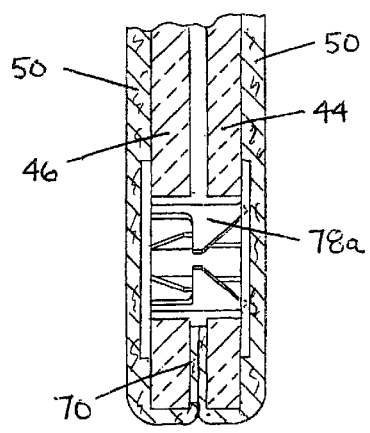
FIG. 8 is a fragmentary sectional view of the assembled sun visor assembly of FIG. 7.
Figure 7:
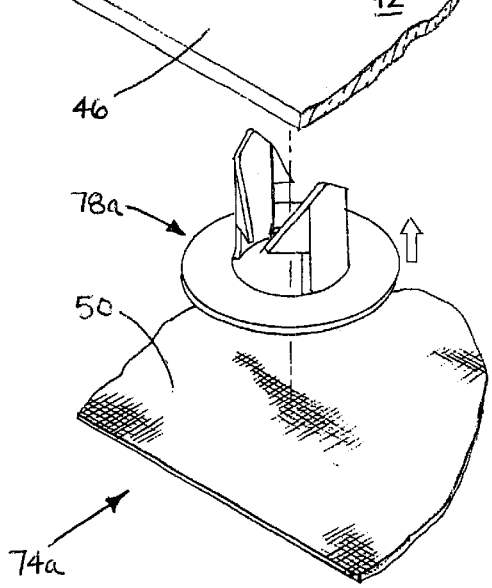
FIG. 7 is a fragmentary exploded view of a sun visor assembly of the present invention, showing the clips of FIG. 6, the foundation halves, and the upholstery cover.

One embodiment, visor assembly 74a, is shown in FIGS. 7 and 8, and includes upholstery cover 50 and foundation 42, similar to prior visor assembly 40 shown in FIGS. 1–5. Foundation 42 may be made from any suitable material which is moderately stiff, yet which may be folded unto itself to form foundation halves 44, 46, such as kraft paper. Upholstery cover 50 may be made from suitable upholstery materials such as fabric, vinyl, or cloth with bonded foam backing, for example. Visor assembly 74a also includes a plurality of connecting elements associated therewith, the connecting elements shown as clips 78a which are received within clip apertures 80 of foundation halves 44, 46.

Figure 6:
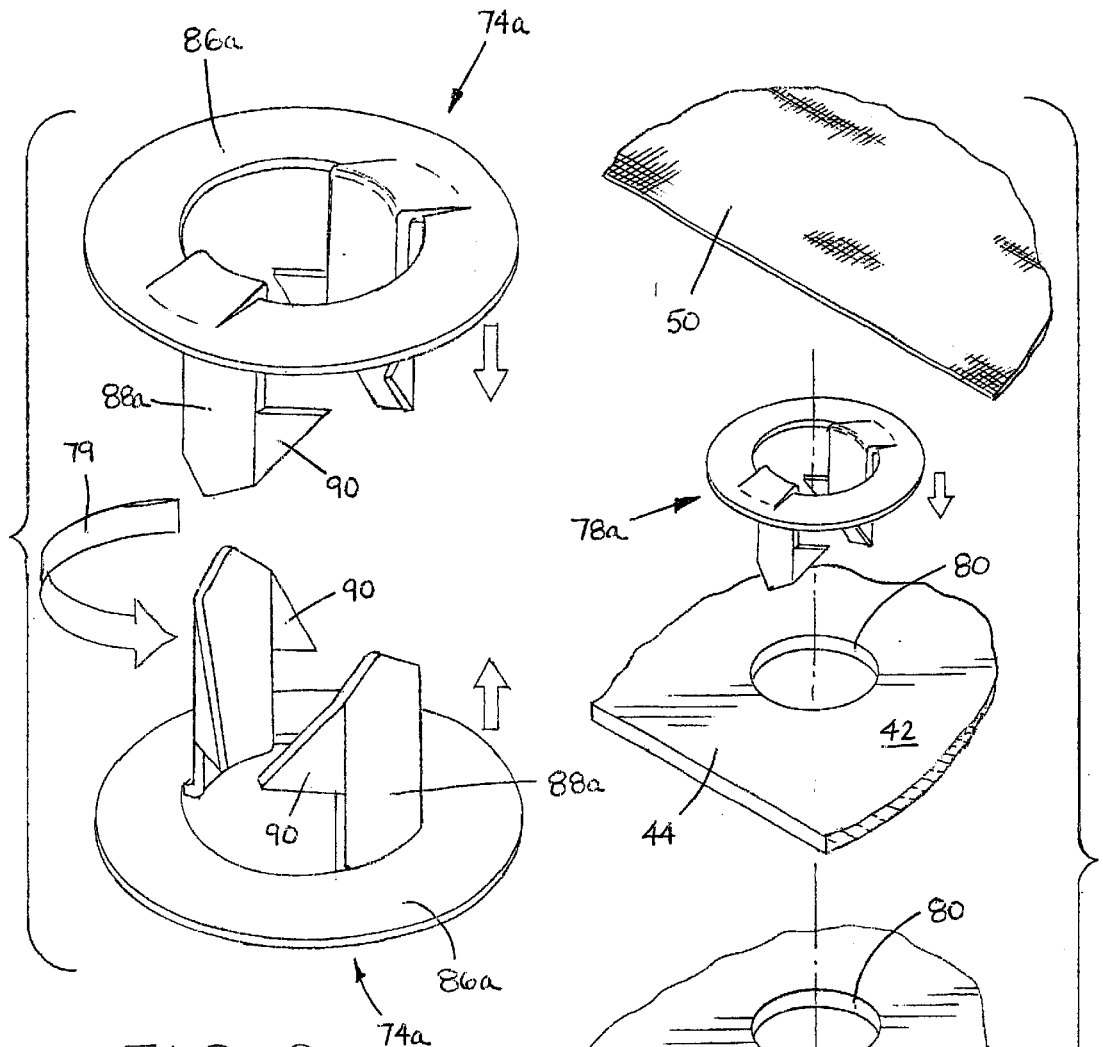
FIG. 6 is a perspective view of connecting elements, shown as a pair of first clips, being pressed together into engagement.

Referring to FIG. 6, clips 78a each include head 86a with a pair of parallel legs 88a depending therefrom. Legs 88a each include at least two pointed parallel arms 90 depending laterally from opposite sides of each leg 88a. Clips 78a may be pressed together as shown in FIG. 6 such that legs 88a engage one another, with clips 78a disposed at a 90° angle with respect to one another. Each leg 88a of one clip extends between a pair of legs 88a of the opposite clip 78a with arms 90 of clips 78a interlockingly engaging one another. Clips 78a are made of a resilient plastic material which allows legs 88a and arms 90 to resiliently bend and/or deform as needed, allowing clips 78a to engage one another with a snap lock connection.

If corresponding clips 78a are not initially disposed at a 90° angle with respect to one another, the engagement between arms 90 of opposing clips 78a automatically rotates clips 78a with respect to one another until clips 78a are disposed at a 90° angle with respect to one another, as shown by arrow 79 in FIG. 6. Therefore, corresponding clips 78a associated with foundation halves 44, 46 do not have to be aligned exactly at a 90° angle with respect to one another before foundation halves 44, 46 are pressed together to engage clips 78a, which simplifies the manufacture of sun visor assembly 74a.

Visor assembly 74b, similar to visor assembly 74a, is shown in FIGS. 10 and 11, including clips 78b which engage one another to secure foundation halves 44, 46 together as described above. Clips 78b, as may be seen in FIG. 9, include heads 86b with a pair of parallel legs 88b depending therefrom, each leg 88b including a row of internally directed catches 92. Each catch 92 includes a tapered lower side 94 and a top surface 96 which is substantially flat. Legs 88b also include integral support ribs 98 which bisect catches 92.

As shown in FIG. 9, clips 78b may be pressed together with clips 78b disposed at a 90° angle with respect to one another, wherein tapered lower sides 94 of catches 92 of one clip 78b engage tapered lower sides 94 of catches 92 of an opposite clip 78b to bend legs 88b of clips 78b slightly outwardly until corresponding catches 92 pass one another, whereupon legs 88b return to their original positions with top surfaces 96 of corresponding catches 92 contacting one another to lock clips 78b together. This process is sequentially repeated as clips 78b are pressed further toward one another, such that catches 92 sequentially engage one another in a ratcheting, stepwise manner. Advantageously, this manner of engagement allows the same clips 78b to be used with foundations 42 of different thicknesses such that, for example, when a relatively thin foundation is used, three or four catches 92 of corresponding clips 78b may engage one another, and when a relatively thicker foundation is used, one or two catches 92 of corresponding clips 78b may engage one another.

Similar to clips 78a, and as shown by arrow 79 in FIG. 9, if corresponding clips 78b are not initially disposed at a 90° angle with respect to one another, contact between tapered lower sides 94 of catches 92 automatically rotates clips 78b with respect to one another until clips 78b are disposed at a 90° angle with respect to one another, whereupon catches 92 of clips 78b may properly sequentially engage one another as described above.

Sun visor assembly 74c, similar to sun visor assemblies 74a and 74b, is shown in FIGS. 15 and 16, including clips 78c which engage one another to secure foundation halves 44, 46 together as described above. As shown in FIG. 14, each clip 78c includes head 86c, and a pair of parallel legs 88c depending from head 86c. Each leg 88c includes a curved ramp surface 100 on one side thereof, and a hook 102 projecting from a sloped distal end 101 of each leg 88c on a side thereof opposite curved ramp surface 100. When associated clips 78c are pressed together, each leg 78c of one clip 78c extends between legs 88c of another clip 78c, with hooks 102 contacting opposing curved ramped surfaces 100, causing clips 78c to rotate 90° with respect to one another before hooks 102 of each leg 88c are snap-fit into the recessed areas 104 defined between lower edges 106 of curved ramp surfaces 100 and the undersides of each hook 102.

Similar to clips 78a and 78b, and as shown by arrow 79 in FIG. 14, if corresponding clips 78c are not initially disposed with respect to one another as shown in FIG. 14, contact between sloped distal ends 101 of opposing clips 78c automatically rotates clips 78c with respect to one another until clips 78c are disposed as shown in FIG. 14, whereupon clips 78c may engage one another as described above.

Figure 30A:
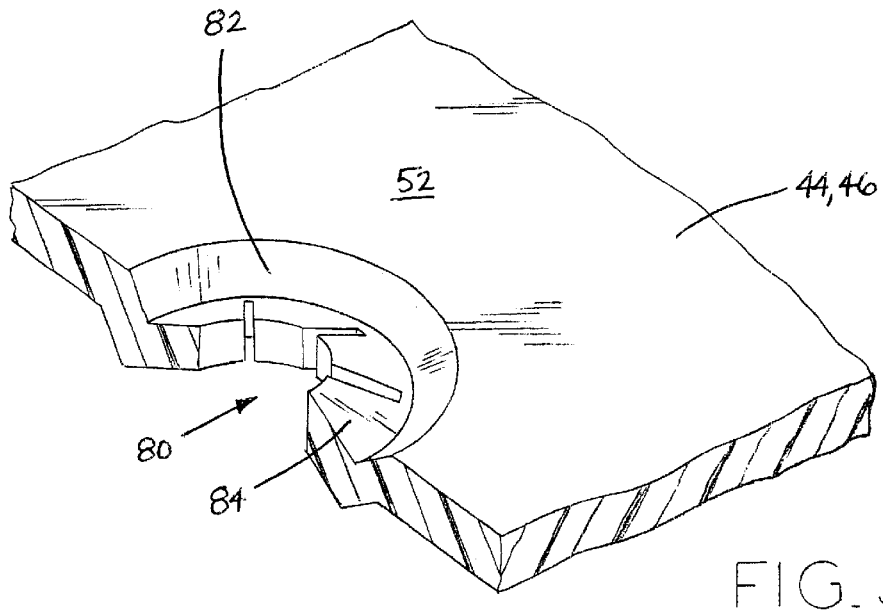
FIG. 30a is a fragmentary view of a foundation half of a sun visor assembly, shown with a recess around an aperture thereof, and a plurality of segment fingers.
Figure 30B:
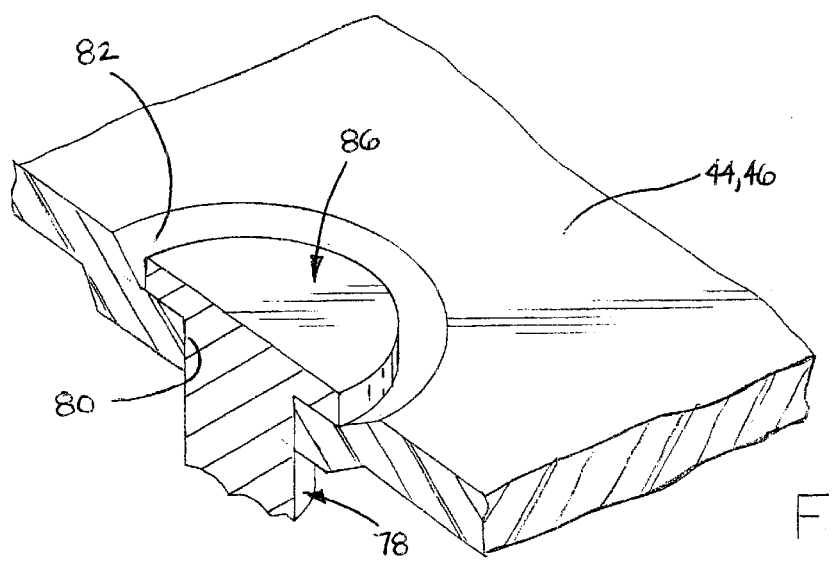
FIG. 30b is a fragmentary view of the foundation half of FIG. 30a, with a clip disposed in the aperture.
Figure 30C:
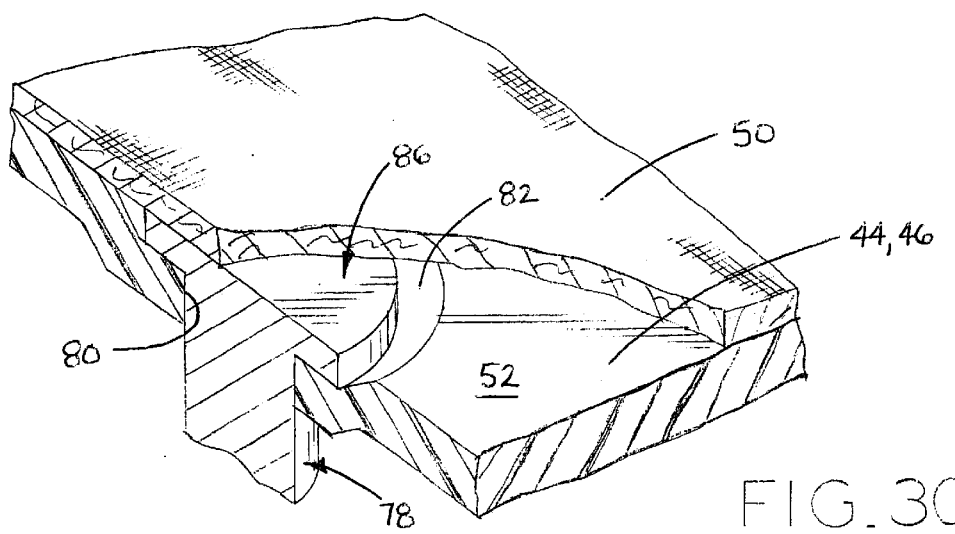
FIG. 30c is a fragmentary view of the foundation half and clip of FIG. 30b, further showing a portion of an upholstery cover.

As shown in FIGS. 30a–c, foundation halves 44, 46 may include recesses 82 formed in exterior surfaces 52 of foundation halves 44, 46 around clip apertures 80. Recesses 82 may include a plurality of segment fingers 84 which are pretensioned to deform and frictionally retain clips 78a–c upon insertion of clips 78a–c into clip apertures 80. Heads 86a–c of clips 78a–c are received within recesses 82 such that the top surfaces of heads 86a–c are substantially flush with external surface 52 of foundation 42, thereby allowing upholstery cover 50 to uniformly cover and span both foundation 42 and heads 86a–c of clips 78a–c, such that clips 78a–c are hidden from view in the assembled sun visor, and upholstery cover 50 does not need to stretch around clips 78.

As shown in connection with clips 78b in FIGS. 9–11, each of clips 78a–c may additionally include outwardly directed, external hooks 112 which engage the interior surface of foundation 42 to secure clips 78 within clip apertures 80 of foundation 42.

Figure 12:
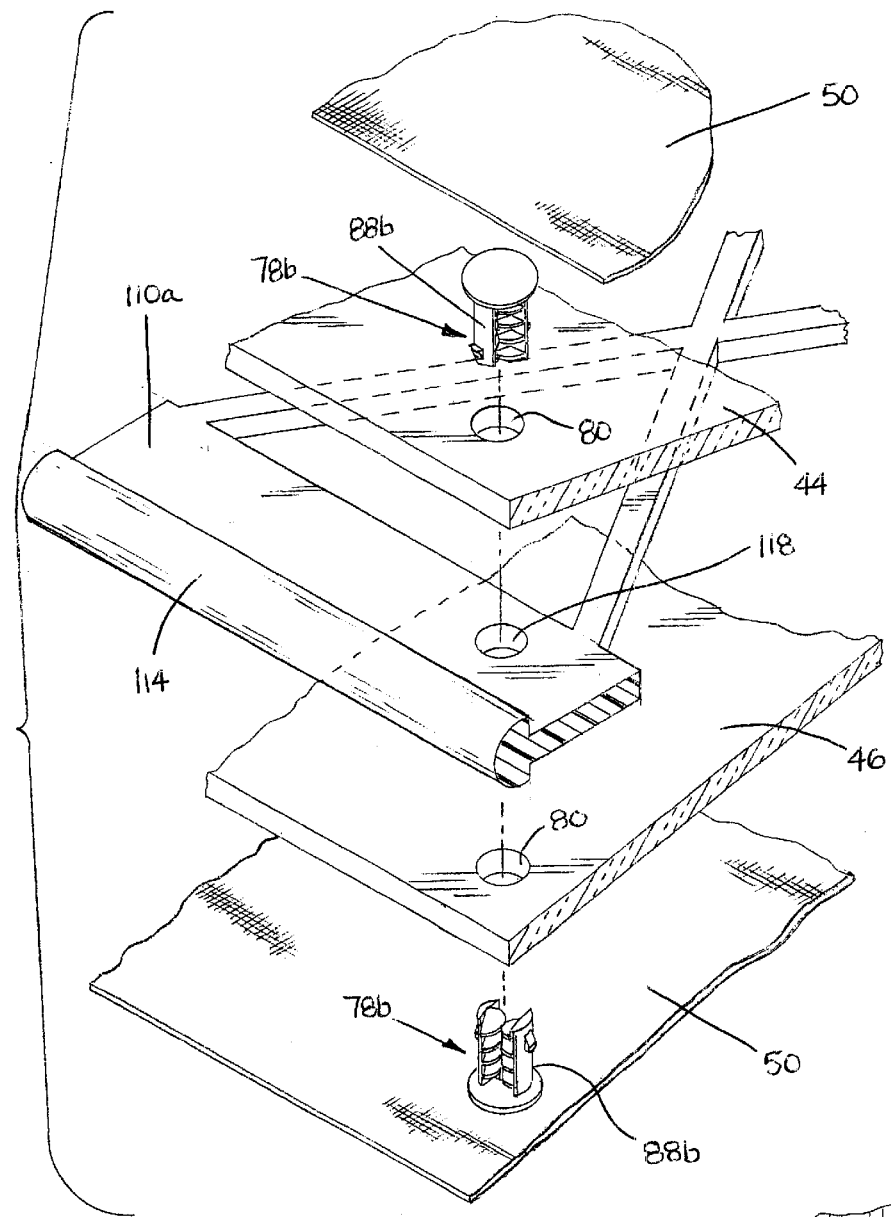
FIG. 12 is a fragmentary exploded view of an another sun visor assembly of the present invention, showing a frame member disposed between the foundation halves, and a pair of clips securing the foundation halves together with the frame member therebetween.
Figure 13:
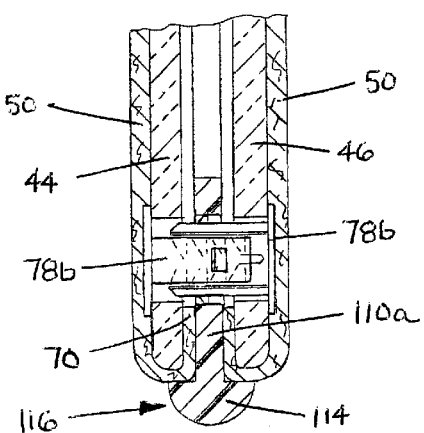
FIG. 13 is a fragmentary sectional view of the assembled sun visor assembly of FIG. 12.
Figure 17:
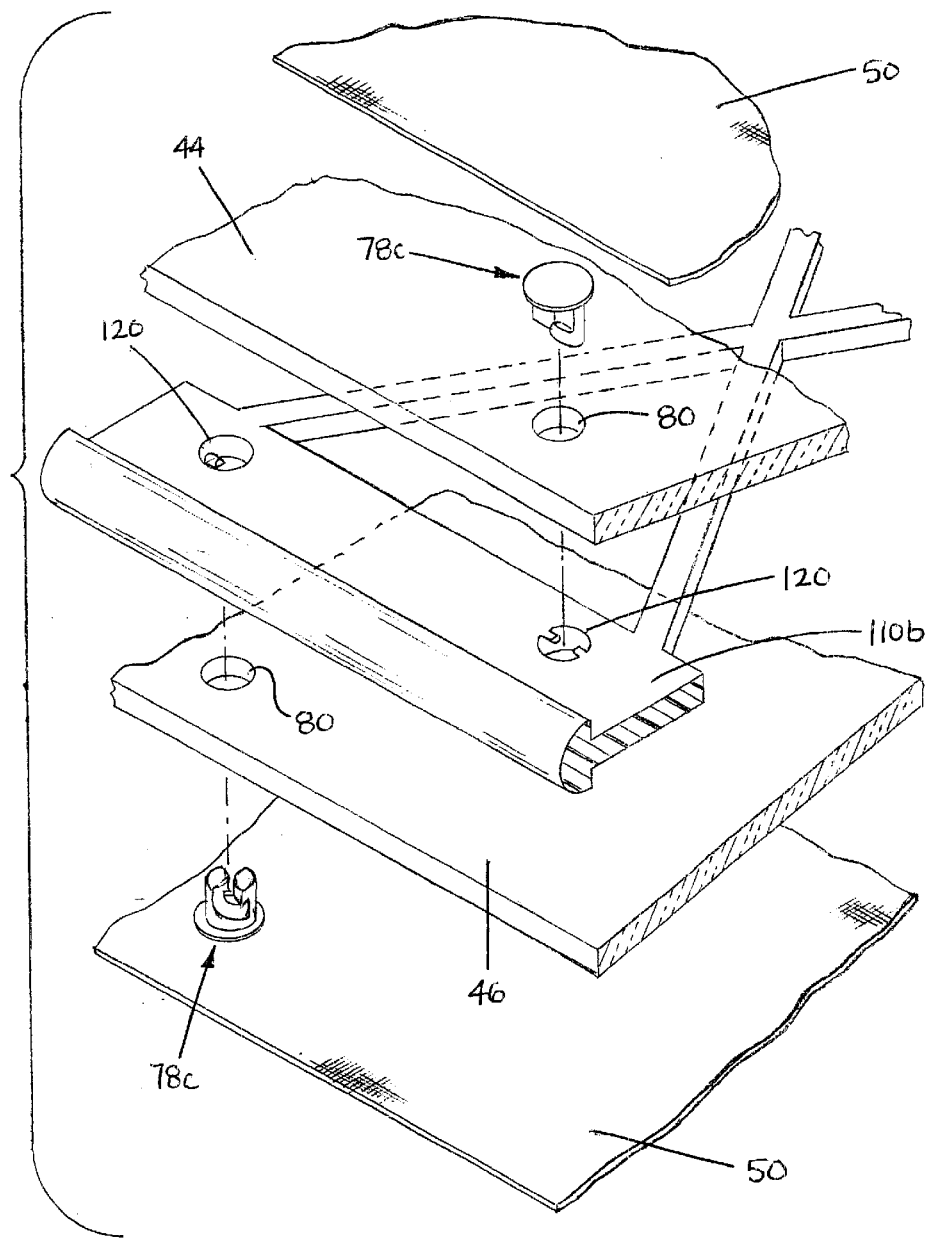
FIG. 17 is a fragmentary exploded view of an another sun visor assembly of the present invention, showing a frame member having clip receptacles and disposed between the foundation halves, and a pair of clips securing the foundation halves to the frame member.
Figure 18:
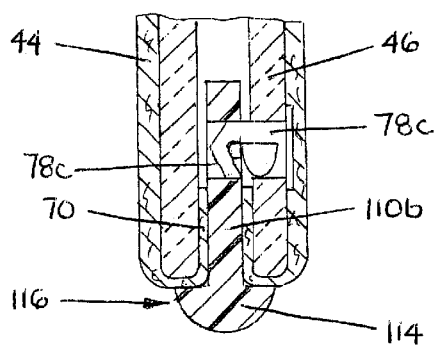
FIG. 18 is a fragmentary sectional view of the assembled sun visor assembly of FIG. 17.

Referring to FIGS. 12, 13, 17, and 18, clips 78a–c may additionally be used with frame members 10a, 10b, which are disposed between foundation halves 44, 46. Frame members 10a, 10b may be made of a plastic material such as polypropylene, ABS plastic, or nylon, and may include rounded bead portion 114 forming beaded edge 116 of the sun visor, as shown in FIGS. 13 and 18. As shown in FIGS. 12 and 13, frame member 110a includes a plurality of openings 118 therein, which may receive legs 88a–c of any of clips 78a–c therethrough, such as legs 88b of clips 78b shown in FIGS. 12 and 13 for example, with legs 88a–c of clips 78a–c engaging one another as described above to secure foundation halves 44, 46 to opposite sides of frame member 110a.

As shown in FIGS. 17 and 18, frame member 110b includes a plurality of connecting elements, shown as clip receptacles 120, for example, which are disposed in an offset, alternating fashion in opposite sides of frame member 110b. Clip receptacles 120 may be shaped to lockingly receive any of clips 78a–c therein, such as clips 78c shown in FIGS. 17 and 18 for example, to secure foundation halves 44, 46 to opposite sides of frame member 110b. In this manner, foundation halves 44, 46 are not secured to one another by clips 78a–c; rather, clips 78a–c associated with each foundation half 44, 46 engage clip receptacles 120 provided in frame member 110b to secure foundation halves 44, 46 to opposite sides of frame member 110.

Figure 19:
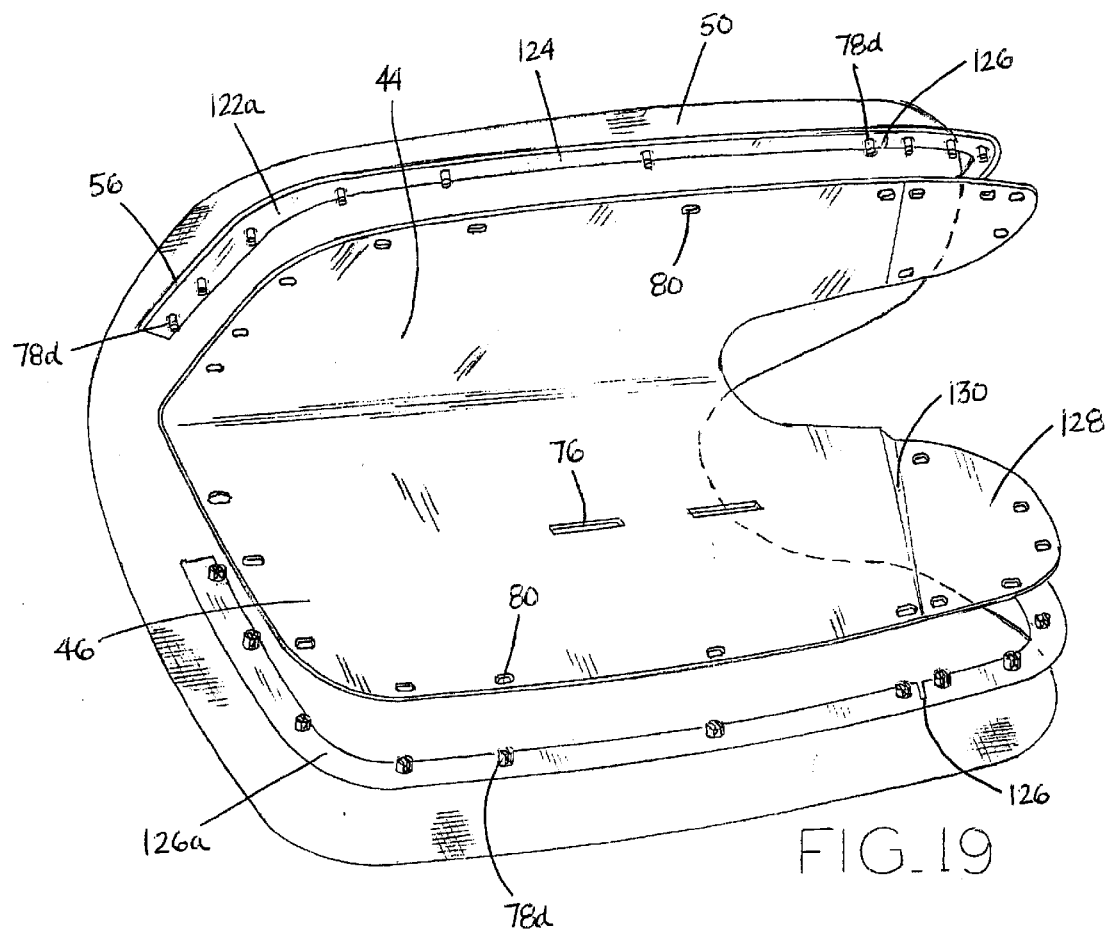
FIG. 19 is an exploded perspective view of an another sun visor assembly of the present invention, showing the foundation, the upholstery cover, and a pair of first connecting strips.
Figure 20:
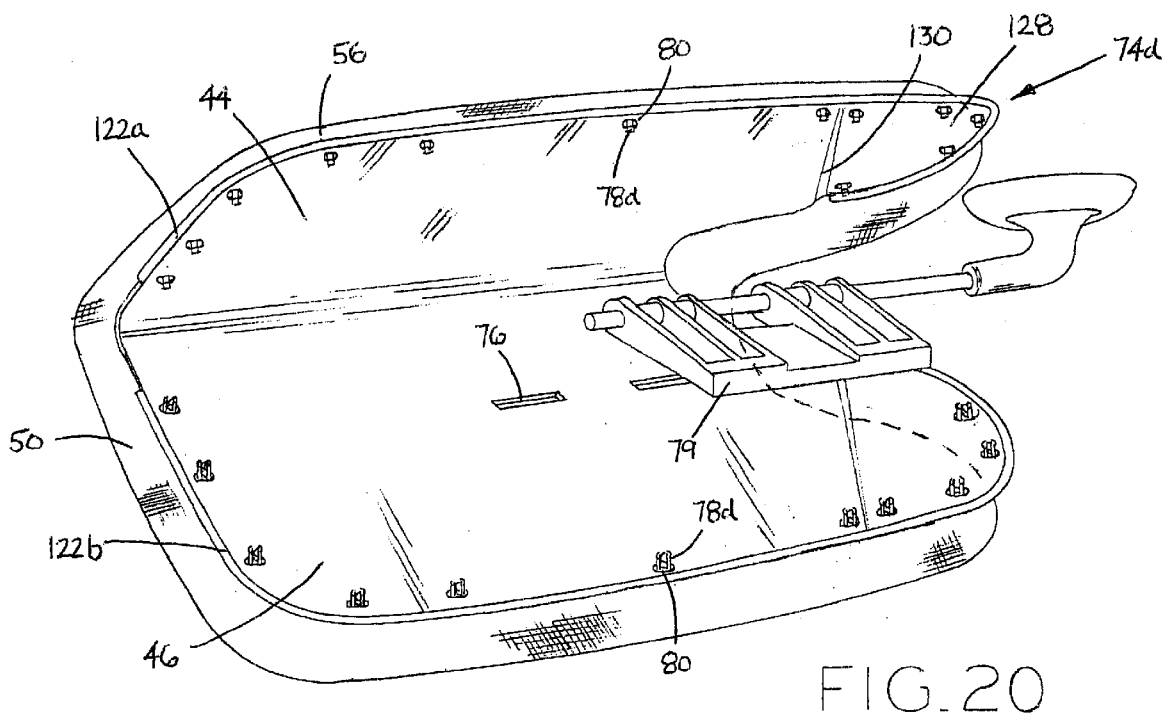
FIG. 20 is an perspective view of the sun visor assembly of FIG. 19, showing the first connecting strips associated with the foundation, and also showing a hinge block for placement between the foundation halves.

Sun visor assembly 74d, shown in FIGS. 19–21, is similar to sun visor assemblies 74a–c. However, rather than including a plurality of clips 78a–c associated with each foundation half 44, 46, sun visor assembly 78d includes first connecting strips 122a, 122b associated with respective foundation halves 44, 46. Each connecting strip 122a, 122b includes stem portion 124 having a plurality of integrally formed clips 78d which project therefrom at spaced intervals. Clips 78d of connecting strips 122a, 122b may be substantially identical to any of clips 78a–c which are described above. Connecting strips 122a, 122b may additionally include bulbous portions 56 which, when pressed together as shown in FIG. 21, form rounded bead member 58 which defines beaded edge 116 around the periphery of the sun visor. Cutouts 76 may be formed in foundation 42 to accommodate protrusions (not shown) of hinge block 79 to mount hinge block 79 within visor assembly 74d. Additionally, a clip assembly or vanity mirror assembly may be mounted within visor assembly 74d in a similar manner. Such vanity mirror assemblies, clip assemblies, and hinge blocks may be similar to those disclosed in U.S. Pat. No. 5,580,118, assigned to the assignee of the present application, the disclosure of which is hereby incorporated by reference.

As may be understood from the above description of clips 78a–c, clips 78d of corresponding connecting strips 122a, 122b are disposed at a 90° angle with respect to one another to facilitate engagement between corresponding clips 78d, as described above in connection with clips 78a–c. Connecting strips 122a, 122b additionally include cutout slots 126 which allow rounded flat portion 128 of sun visor assembly 74 to be bent along crease lines 130. Foundation halves 44, 46 may include a plurality of apertures 80 along the peripheral edges thereof, which receive clips 78d of connecting strips 122a, 122b therethrough to connect connecting strips 122 with foundation halves 44, 46. Optionally, each clip 78d of connecting strips 122 may further include external hooks 112, as described above, which engage interior surfaces of foundation halves 44, 46 in order to secure connecting strips 122a, 122b to foundation halves 44, 46. Advantageously, connecting strips 122a, 122b, having a plurality of clips 78d integrally formed therewith, allow foundation halves 44, 46 of sun visor assembly 74d to be clip locked together without the use of a plurality of individual clips 78a–c, thereby reducing the number of components of sun visor assembly 74d and simplifying the complexity and cost of assembly thereof.

Figure 31A:
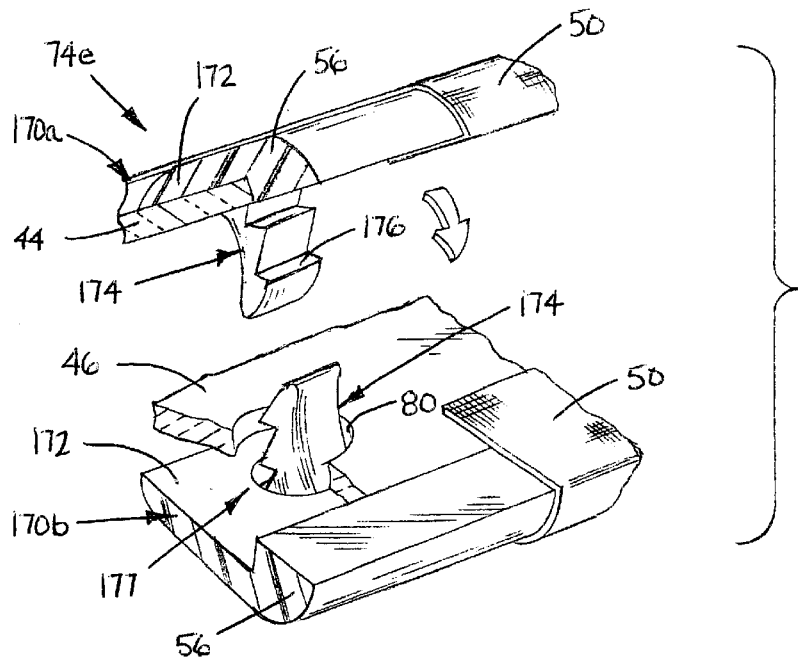
FIG. 31a is a fragmentary view of a further sun visor assembly of the present invention, showing a pair of second connecting strips associated with a pair of foundation halves and an upholstery cover covering the foundation halves, the foundation halves being pressed together.
Figure 31B:
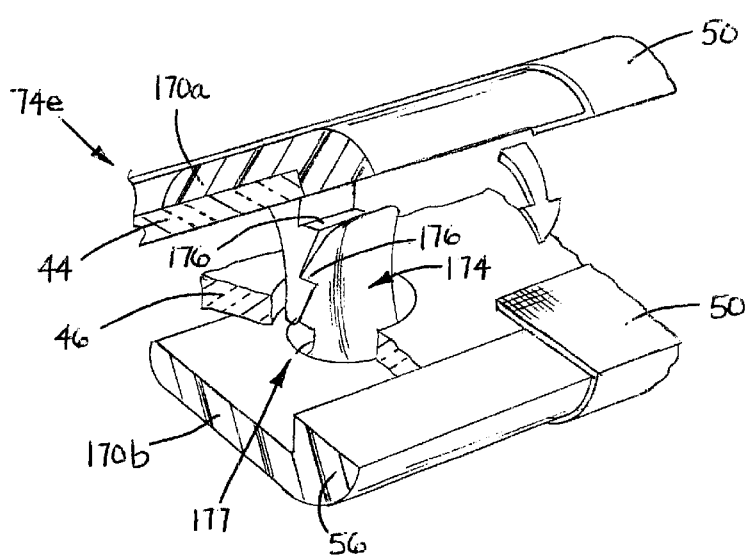
FIG. 31b is a fragmentary view of the sun visor assembly of FIG. 31a, with the foundation halves being pressed further together to engage the ratchet legs of the second connecting strips.
Figure 31C:
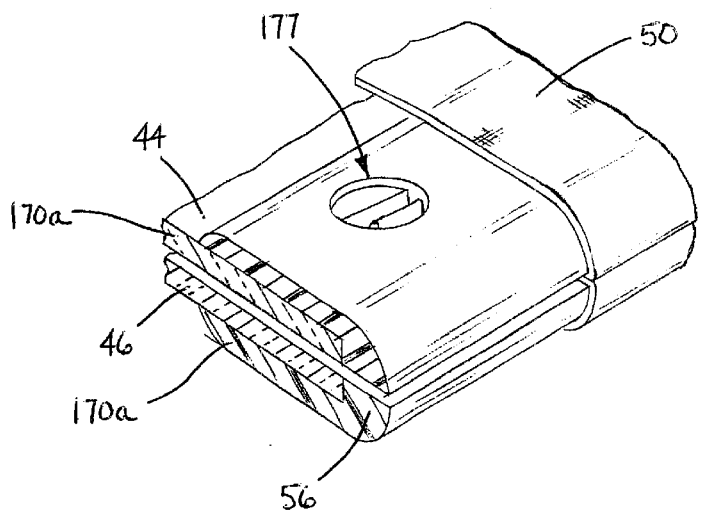
FIG. 31c is a fragmentary view of the assembled sun visor assembly of FIGS. 31a–b.
Figure 32:
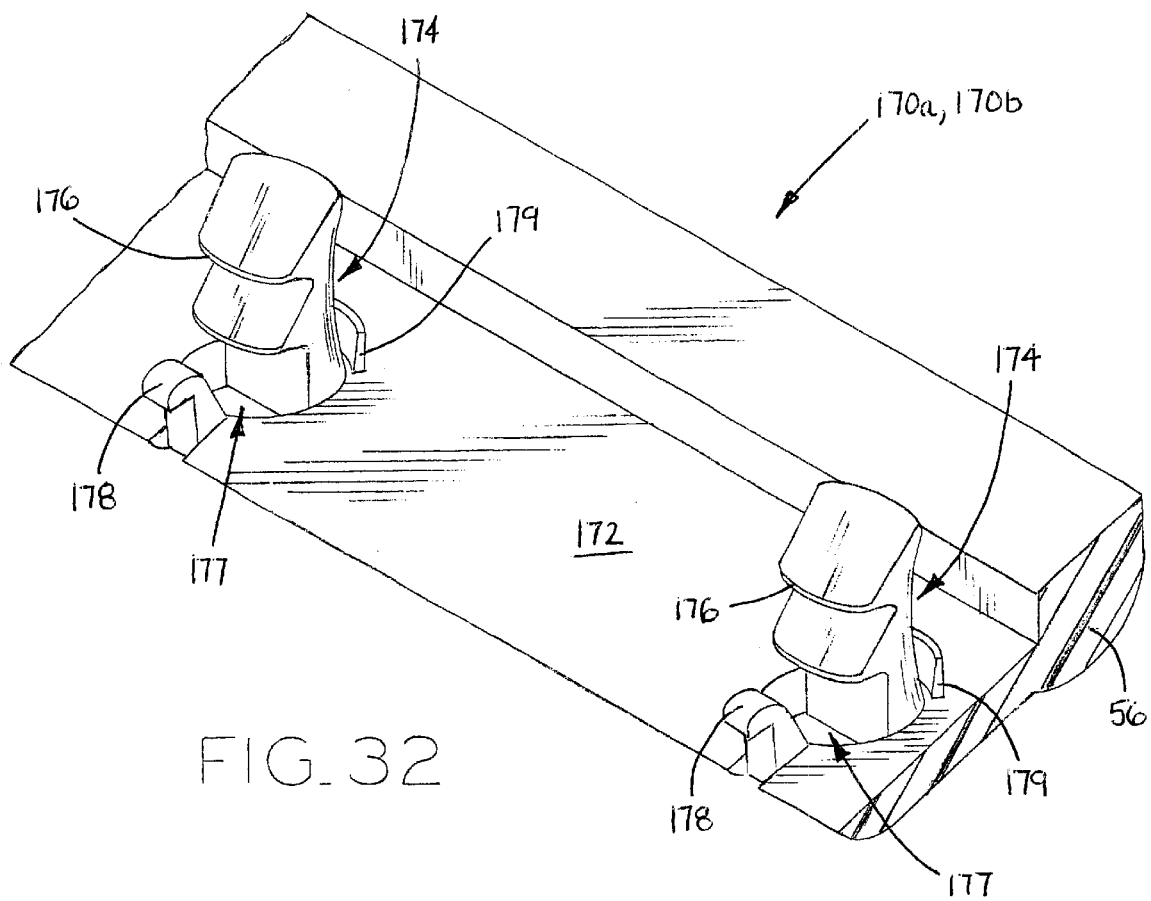
FIG. 32 is a fragmentary view of one of the second connecting strips of FIGS. 31a–c, showing ratchet legs, hooks, and ribs thereof.
Figure 33:
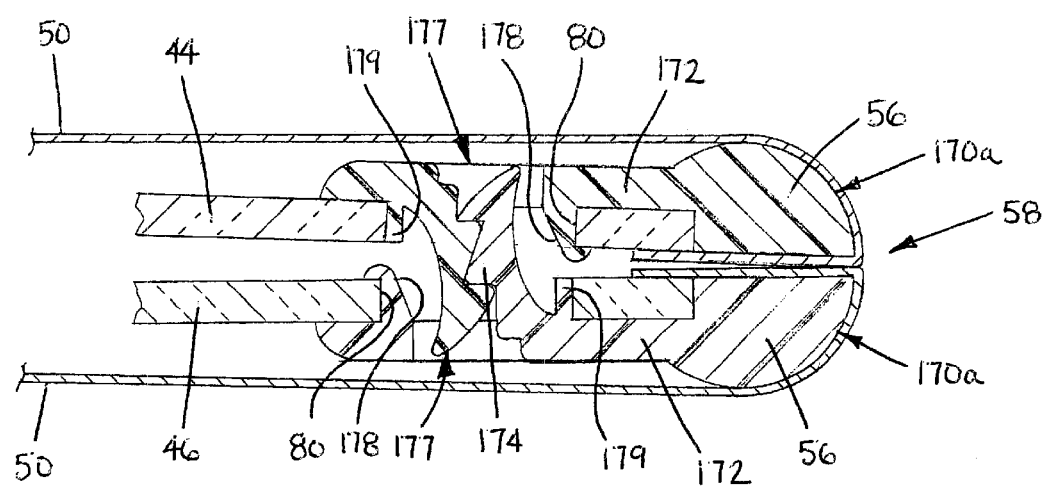
FIG. 33 is a fragmentary sectional view of the assembled sun visor assembly of FIGS. 31c.

Sun visor assembly 74e is shown in FIGS. 31a–33, which is similar to sun visor assembly 74d shown in FIGS. 19–21, and includes second connecting strips 170a, 170b, each having stem portion 172 with a plurality of integral ratchet legs 174 formed therewith. Ratchet legs 174 each include a plurality of catches 176 formed therewith. As shown in FIG. 32, stem portions 172 further include hooks 178 and ribs 179 formed therein on opposite sides of ratchet legs 174. When ratchet legs 174 are inserted through apertures 80 in foundation halves 44, 46 as shown in FIG. 33, hooks 178 engage the interior surfaces of foundation halves 44, 46, and ribs 179 abut the interior of apertures 80, such that hooks 178 and ribs 179 cooperate to secure second connecting strips 170a, 170b to foundation halves 44, 46, respectively.

As shown in FIGS. 31a and 31b, when foundation halves 44, 46 of visor assembly 74e are pressed together, catches 176 of opposing ratchet legs 174 engage one another in a ratcheting, stepwise manner, with each ratchet leg 174 of one connecting strip 170a, 170b extending through a corresponding opening 177 in the stem portion 172 of an opposite connecting strip 170a, 170b. Referring to FIG. 33, it may be seen that the distal ends of ratchet legs 174 do not extend past stem portions 172 in the opposite connecting strips 170a, 170b, such that upholstery cover 50 may smoothly and uniformly cover connecting strips 170a, 170b.

Advantageously, the ratcheting, stepwise engagement between ratchet legs 174 of connecting strips 170a, 170b allows connecting strips 170a, 170b to be used with foundations 42 of different thicknesses such that, for example, when a relatively thick foundation is used, one or two catches 176 of corresponding connecting strips 170a, 170b may engage one another, and when a relatively thinner foundation is used, two or three catches 176 of corresponding connecting strips 170a, 170b may engage one another. Connecting strips 170, 170b each may include bulbous portions 56 which, when pressed together as shown in FIG. 33, form rounded bead member 58 which defines a beaded edge around the periphery of the sun visor.

Sun visor assembly 74f is shown in FIGS. 34a–35, including third connecting strips 180a, 180b. Connecting strips 180a, 180b are similar to connecting strips 170a, 170b, and such similar features thereof will not be further discussed herein. As shown in FIG. 34, connecting strip 180a includes locking fingers 184, which lockingly receive and retain heads 190 of posts 188 formed with connecting strip 180b to secure connecting strips 180a, 180b to one another. Connecting strips 180a, 180b additionally include catch hooks 192, which retain edge portion 70 of upholstery cover 50 when wrapped around the edge of connecting strips 180a, 180b, as well as tapering trailing edges 194, which provide a smooth transition for upholstery cover 50 from connecting strips 180a, 180b to foundation halves 44, 46, respectively. Catch hooks 192 and trailing edges 194 may be included with connecting strips 122a–b and 170a–b.

In addition to the above-described embodiments in which foundation halves 44, 46 may be secured to one another or to frame members 10a, 110b using connecting elements such as clips 78a–c or connecting strips 122a–b, 170a–b, or 180a–b, foundation halves 44, 46 may also be secured to a frame member using interlocking systems, which are described below, and which include connecting elements formed in each of the foundation halves and frame members.

Figure 23:
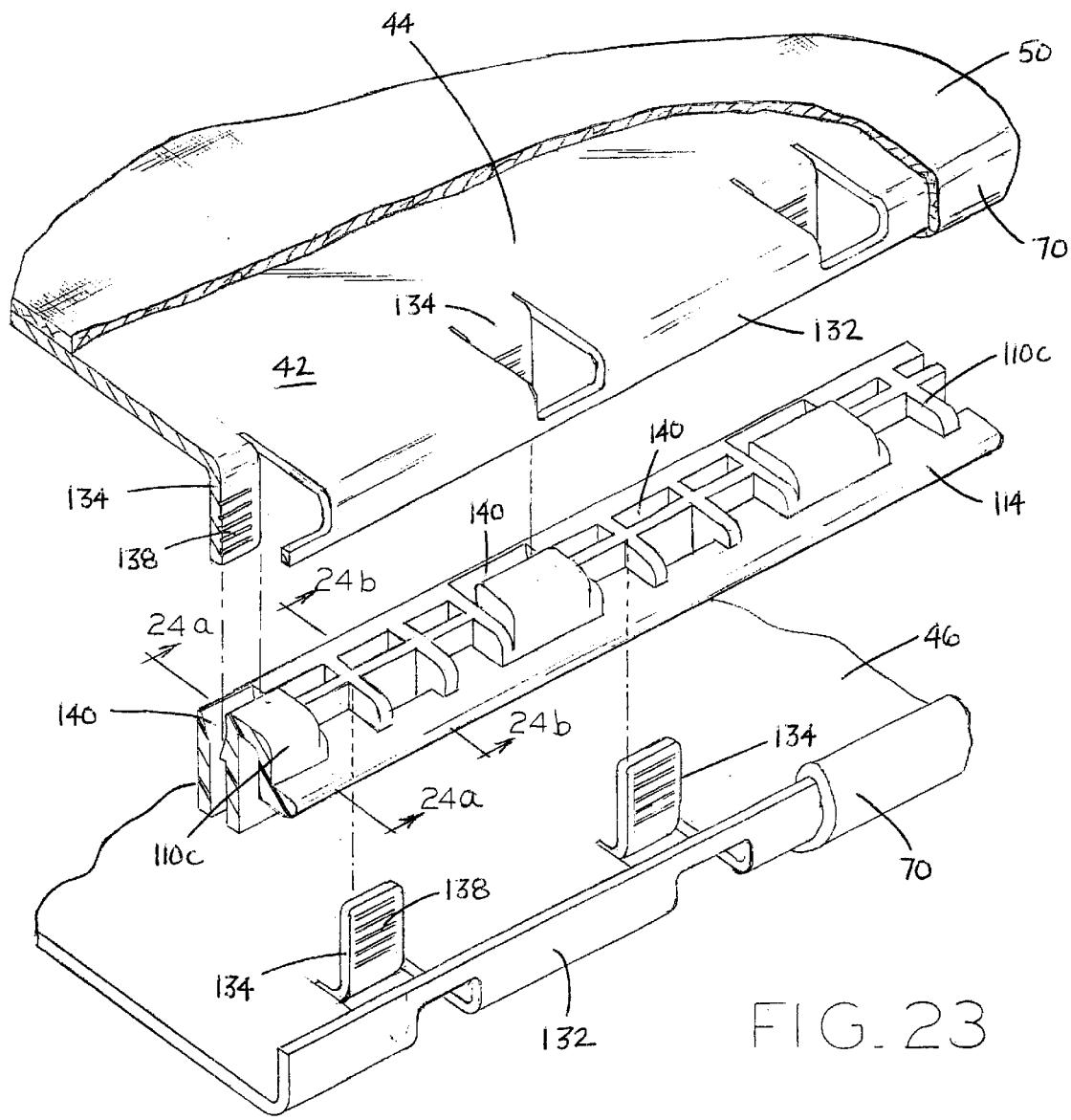
FIG. 23 is a fragmentary exploded view of another sun visor assembly of the present invention, including the foundation halves of FIG. 22c, and a frame member disposed between the foundation halves to which the foundation halves are attached.

As shown in FIG. 23, sun visor assembly 74g includes foundation halves 44, 46 which are formed with bent edge portions 132 and connecting elements, the connecting elements shown in FIG. 23 as tabs 134. With reference to FIGS. 22a–c, in forming bent edge portions 132 and tabs 134, outlines 136 of tabs 134 are first die cut in foundation halves 44, 46, and a plurality of recessed notches 138 are pressed into foundation halves 44, 46 within outlines 136. Then, the portions of foundation halves 44, 46 within outlines 136 are bent to form tabs 134 which depend from foundation halves 44, 46 as shown in FIG. 22c. Additionally, edges 48 of foundation halves 44, 46 adjacent tabs 134 may also be bent as shown in FIG. 22c to form bent edge portions 132 of foundation halves 44, 46.

Figure 24A:
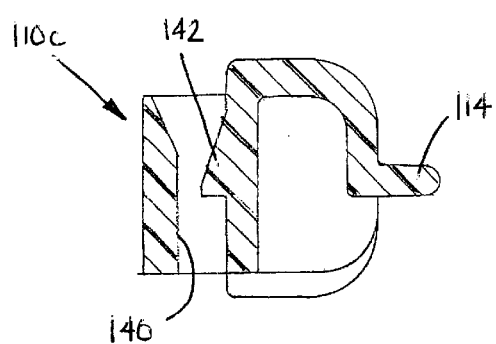
FIG. 24a is a sectional view along line 24a–24a of FIG. 23.
Figure 24B:
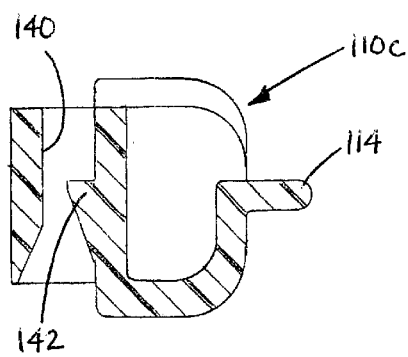
FIG. 24b is a sectional view along line 24b–24b of FIG. 23.

As shown in FIG. 23, frame member 110c includes connecting elements, shown as a plurality of offset, alternating slots 140 formed therein, including locking tabs 142 disposed within each slot 140, as shown in FIGS. 24a and 24b. Tabs 134 of foundation halves 44, 46 are pressed into slots 140 such that locking tabs 142 of slots 140 sequentially engage recessed notches 138 formed in tabs 134 in a ratcheting, stepwise manner to secure foundation halves 44, 46 to frame member 110c. Frame member 110c may additionally include rounded bead member 58 projecting therefrom, against which bent edge portions 132 of foundation halves 44, 46 abut when foundation halves 44, 46 are secured to frame member 110c. As shown in FIG. 23, upholstery cover 50 is sandwiched between bent edge portions 132 of foundation halves 44, 46 and rounded bead member 58 of frame member 110c to secure upholstery cover 50 to foundation 42, with rounded bead member 58 of frame member 110c extending externally of upholstery cover 50 to define a beaded edge of the sun visor.

Figure 25:
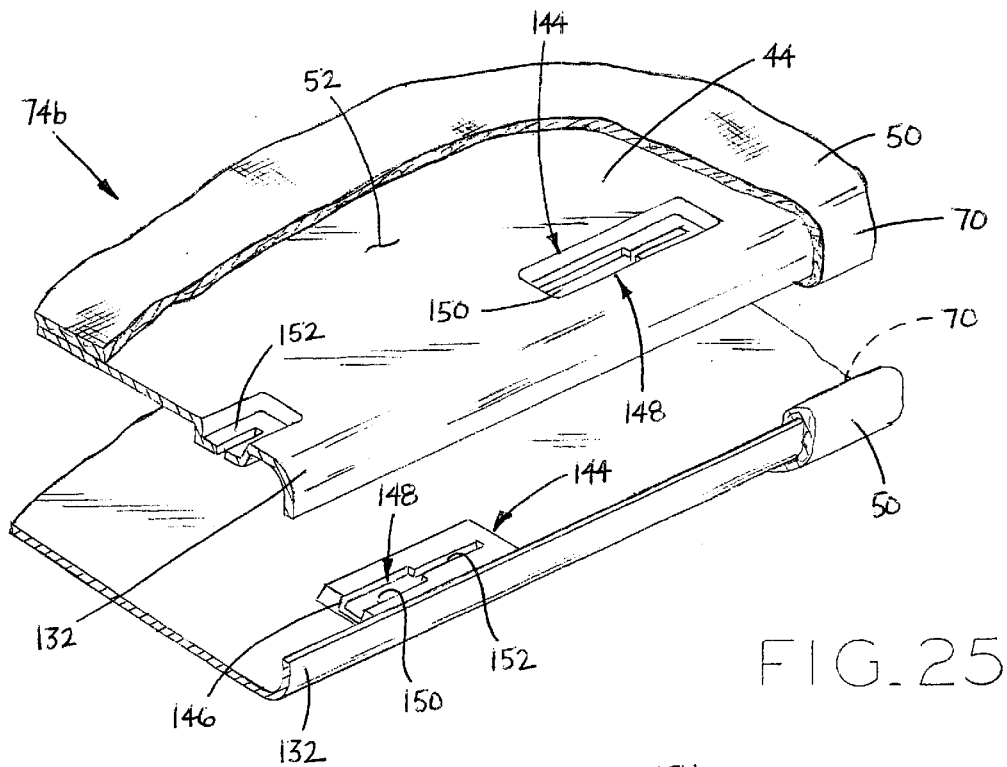
FIG. 25 is a fragmentary view of a pair of foundation halves of a further sun visor assembly of the present invention, the foundation halves each including recessed cavities with slots therein.
Figure 26:
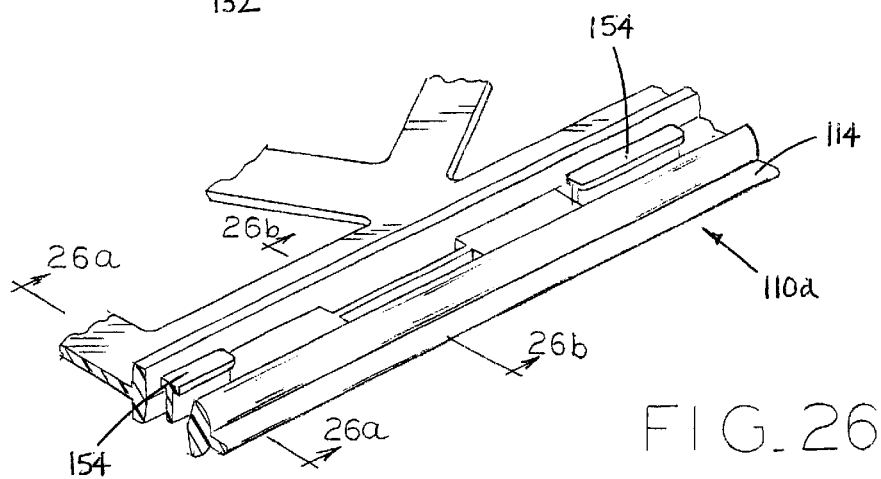
FIG. 26 is a perspective view of a frame member which may be connected to the foundation halves of FIG. 25, the frame member including a plurality of T-shaped tabs projecting therefrom.

Referring to FIGS. 25–27, sun visor assembly 74h includes foundation halves 44, 46 having connecting elements, the connecting elements shown as recessed cavities 144 formed within foundation halves 44, 46. Recessed cavities 144 include insertion openings 146 and slots 148, with slots 148 having wide portions 150 and narrow portions 152. Additionally, foundation halves 44, 46 may include bent edge portions 132 adjacent recessed cavities 144. Frame member 110d is disposed between foundation halves 44, 46 and includes connecting elements shown as a plurality of offset, alternating T-shaped tabs 154 projecting from opposite sides of frame member 110d.

Figures 26A, 26B:
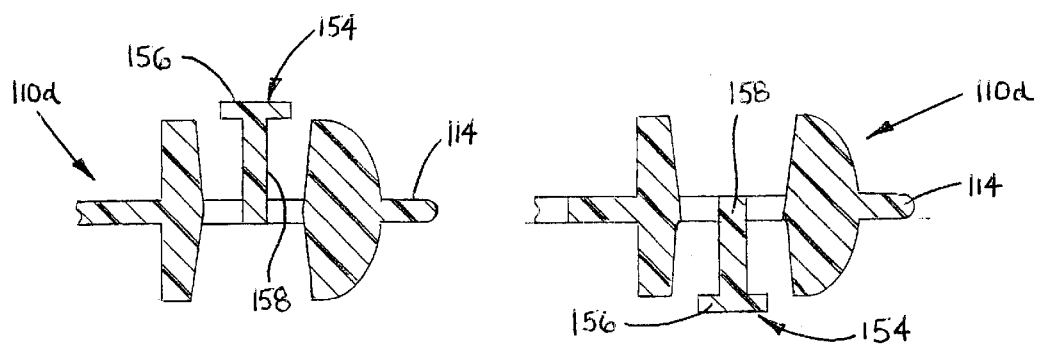
FIG. 26a is a sectional view along line 26a–26a of FIG. 26.
FIG. 26b is a sectional view along line 26b–26b of FIG. 26.

To secure foundation halves 44, 46 to frame member 110d, heads 156 of T-shaped tabs 154 are received within insertion openings 146 and wide portions 150 of slots 148, whereupon frame member 110d and foundation halves 44, 46 are moved laterally with respect to one another such that stems 158 of T-shaped tabs 154 pass into narrow portions 152 of slots 148 to secure foundation halves 44, 46 to frame member 110, as may be seen from FIGS. 25–26b. Optionally, recessed cavities 144 may be shaped to be deeper in the area around wide portions 150 of slots 148, and relatively shallower around narrow portions 152 of slots 148, such that heads 146 of T-shaped tabs 154 frictionally engage slots 148 to a greater extent around narrow portions 152 of slots 148 than wider portions 150 of slots 148 to provide a greater friction fit between T-shaped tabs 154 and recessed cavities 144. As shown in FIG. 27, heads 156 of T-shaped tabs 154 are substantially flush with exterior surfaces 52 of foundation halves 44, 46, thereby allowing upholstery cover 50 to uniformly cover and span both foundation halves 44, 46 and T-shaped tabs 154, such that T-shaped tabs 154 are hidden from view in the assembled sun visor, and upholstery cover 50 does not need to stretch around T-shaped tabs 154.

Additionally, frame member 110d may include rounded bead portion 114, against which bent edge portions 132 of foundation halves 44, 46 abut on opposite sides of rounded bead portion 114, with upholstery cover 50 sandwiched between bent edge portions 132 of foundation halves 44, 46 and rounded bead portion 114 of frame member 110d to secure upholstery cover 50 to foundation 42. Rounded bead portion 114 of frame member 110 is disposed externally of foundation halves 44, 46 and upholstery cover 50, and forms an outer edge of the sun visor.

Sun visor assembly 74i is shown in FIG. 28, in which foundation halves 44, 46 are secured to one another using adhesive strips 162. Adhesive strips 162 include adhesive pad 164 having an exposed adhesive on opposite sides thereof, such that, as shown in FIG. 28, when adhesive strips 162 are sandwiched between foundation halves 44, 46, adhesive strips 162 secure foundation halves 44, 46 to one another, with edge portions 70 of upholstery cover 50 wrapped around the edges of foundation halves 44, 46 and tucked between foundation halves 44, 46 to secure upholstery cover 50 to foundation 42. Alternatively, adhesive strips 162 may be strips of a double-sided adhesive tape. Suitable adhesive strips and double-sided adhesive tapes include, for example, VHB™ Double Coated Foam Tapes and Adhesive Transfer Tapes, available from 3M Company of St. Paul Minn. (VHB™ is a trademark of 3M Company). However, other suitable adhesive strips and double-sided adhesive tapes are readily available.

As shown in FIG. 28, a plurality of adhesive strips 162 may be spaced at intervals between foundation halves 44, 46 to secure foundation halves 44, 46 to one another. Optionally, adhesive strips 162 may be cut into various shapes to correspond to the contours of the edges of foundation halves 44, 46, and/or to ensure maximum contact between foundation halves 44, 46 and adhesive strips 162.

As shown in FIG. 29, frame member 110e is disposed between foundation halves 44, 46, and may include a plurality of adhesive strip mounts 166 to which adhesive strips 162 are adhered. Adhesive strip mounts 166 may be integrally formed with frame member 110e, and may be curved as shown in FIG. 29 to correspond with bent edge portions 132 of foundation halves 44, 46. Upholstery cover 50 may be wrapped around the edges of foundation halves 44, 46 and tucked into the interior of sun visor 74 between foundation halves 44, 46 and frame member 110e to secure upholstery cover 50 to foundation 42. Further, adhesive strips 162 may be adhered both to edges 70 of upholstery cover 50 and to bent edge portions 132 of foundation halves 44, 46 to further secure upholstery cover 50, foundation halves 44, 46 and frame member 110e together.

As shown in FIGS. 8, 11, 13, 16, 18, 21, 23, 25, 27–29, 33, and 35, edge portions 70 of upholstery cover 50 are wrapped around the edges of foundation halves 44, 46, and are sandwiched between foundation halves 44, 46 or alternatively, between foundation halves 44, 46 and frame members 110a–e. Edge portions 70 of upholstery cover 50 may be secured to foundation halves 44, 46 using an adhesive, however, the interlocking engagement foundation halves 44, 46 or between foundation halves 44, 46 and frame members 110a–e may be effected with sufficient force to sandwich edge portions 70 of upholstery cover 50 between foundation halves 44, 46 or between foundation halves 44, 46 and frame members 110 such that upholstery cover 50 is secured to foundation 42 without the use of an adhesive.

Figure 36:
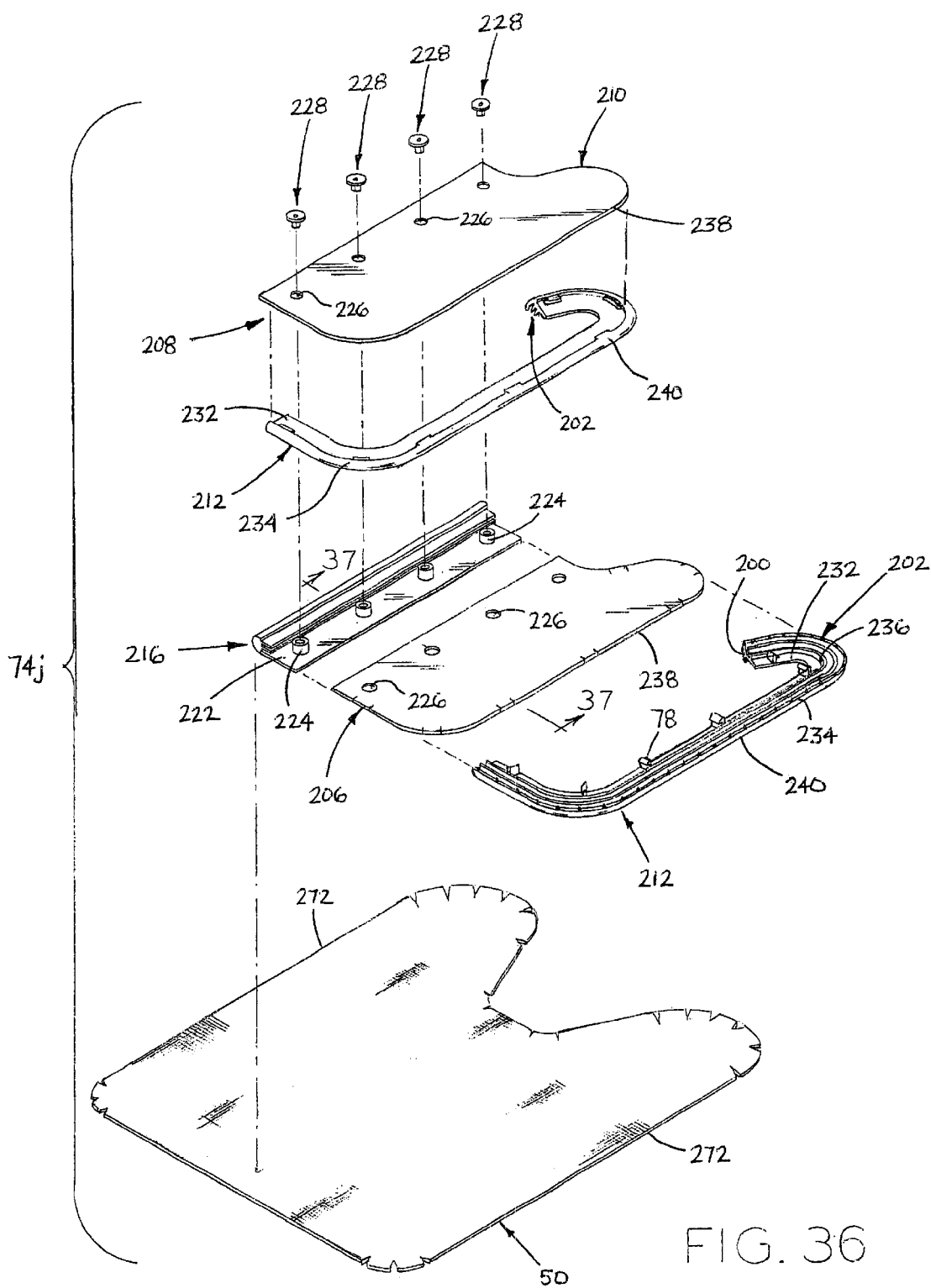
FIG. 36 is an exploded perspective view of a further sun visor assembly of the present invention.
Figure 56:
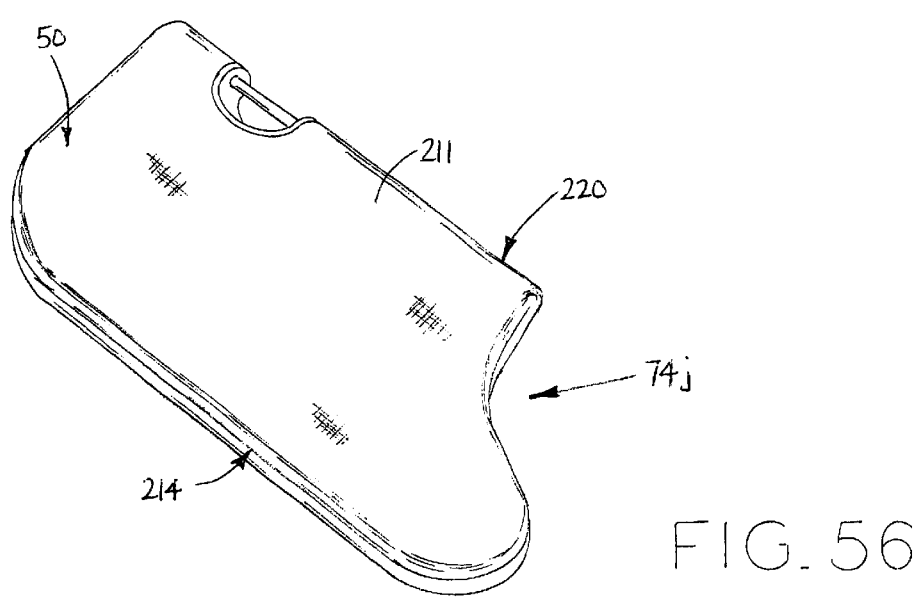
FIG. 56 is a perspective view of an assembled sun visor of FIG. 36.

Sun visor assembly 74j shown in FIGS. 36 and 56 includes liner board interlocking mechanism 200 and upholstery cover retention assembly 202 for securing the components of the sun visor foundation together and attaching the upholstery cover to the foundation halves without the use of adhesive.

Sun visor assembly 74j includes foundation 204 having foundation halves 206, 208, each of which includes cardboard liner board 210 defining visor faces 211, and bead member section 212 defining rounded edges 214 (FIG. 56). In this embodiment of sun visor assembly 74, foundation halves 206, 208 are separate halves which are each secured to edge member 216. Edge member 216 includes bulbous portion 218 which defines rounded edge 220 of visor assembly 74j as shown in FIG. 56. Edge member 216 may be formed from any suitable material including rigid plastic, using a method such as, for instance, injection molding. Integrally formed on inner surface 222 of edge member 216 are a plurality of clip receivers 224. Liner boards 210 of foundation halves 206, 208 are provided with a plurality of apertures 226. Each aperture 226 in liner board 210 of foundation half 206 receives one clip receiver 224 for attaching liner board 210 to edge member 216. Clips 228 extend through apertures 226 in liner board 210 of foundation half 208 to engage clip receivers 224, thus securing liner boards 210 to edge member 216.

Figure 51:
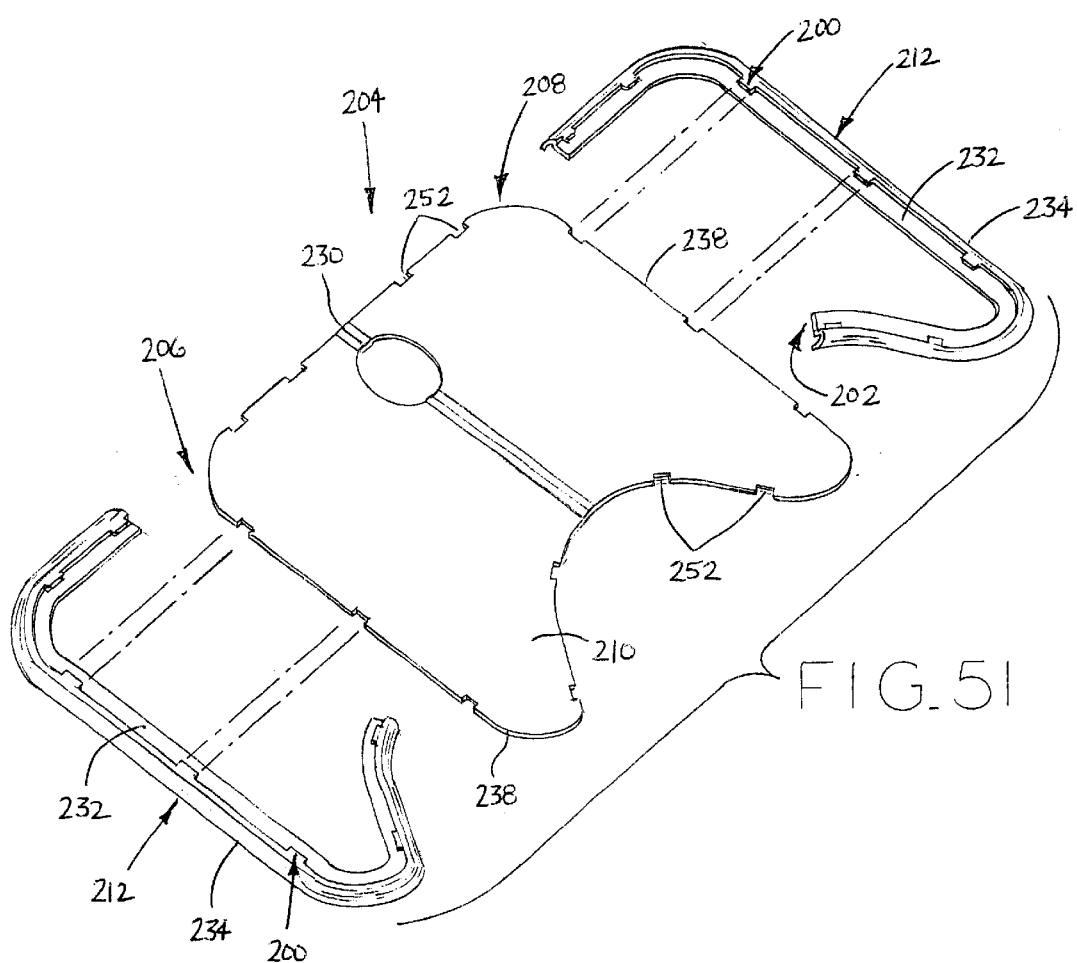
FIG. 51 is an exploded perspective view of the foundation of a sun visor assembly.

Liner board 210 is illustrated in FIG. 36 as being two separate pieces, however, liner board 210 may be a single piece with a join line 230 as shown in FIG. 51. Bead member section 212 includes flat elongated portion 232 and rounded edge portion 234 which are joined by stepped portion 236. Stepped portion 236 provides a space between flat elongated portion 232 and rounded edge portion 234 to accommodate the thickness of liner board 210. Referring to FIG. 51, bead member section 212 is secured to edge 238 of liner board 210 to define the outer perimeter of visor assembly 74j using liner board interlocking mechanism 200 which prevents liner board 210 from separating from bead member sections 212. Several embodiments of liner board interlocking mechanism 200 are described hereinbelow.

Figure 52:
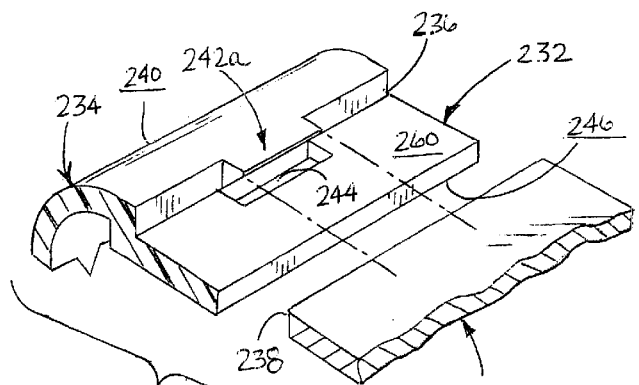
FIG. 52 is a fragmentary perspective view of a first embodiment of a liner board interlocking mechanism.

In a first embodiment of liner board interlocking mechanism 200 illustrated in FIG. 52, an edge catch 242a having a rectangular, platelike shape extends from outer surface 240 of rounded edge portion 234. A plurality of catches 242a are located about the periphery of bead member sections 212 for engaging liner board 210 at a plurality of locations. Edge 238 of liner board 210 is compressed slightly and is forced into cavity 244 defined between edge catch 242a and surface 246 of bead member section 212. Any number of catches 242a may be formed on bead member sections 212 to insure that liner board 210 is prevented from separating from sections 212.

Figure 53:
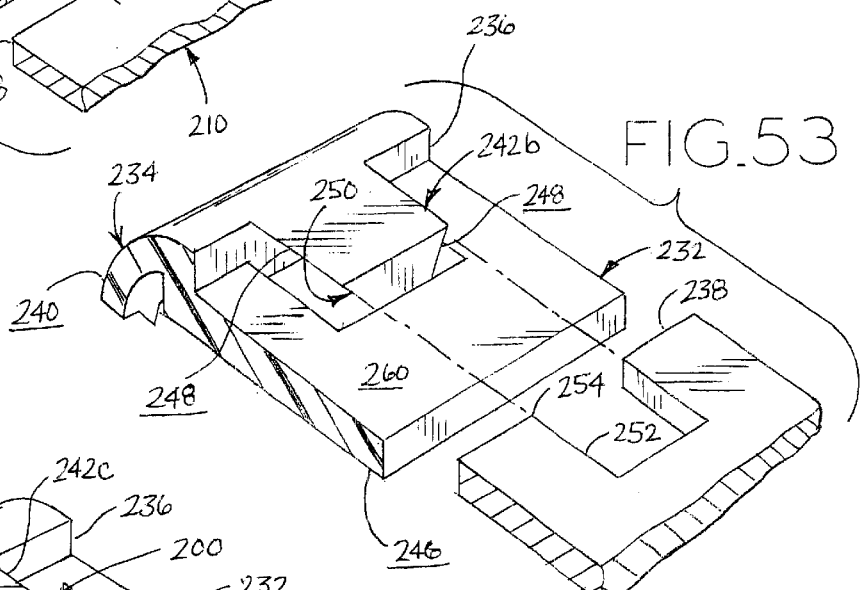
FIG. 53 is a fragmentary perspective view of a second embodiment of a liner board interlocking mechanism.

Referring to FIG. 53, a second embodiment of liner board interlocking mechanism 200 includes edge catch 242b which protrudes approximately perpendicular from stepped portion 236. Edge catch 242b has a trapezoidal cross section. Surfaces 248 define notched portions 250 for receiving liner board 210. Notch 252 is cut into liner board 210 to receive edge catch 242b. When liner board 210 and bead member section 212 are assembled, corners 254 of liner board 210 are first compressed after which liner board 210 is slid into contact with edge catch 242b. As liner board 210 is assembled with bead member section 212, liner board 210 is further compressed with the compressed surfaces thereof being in contact with surfaces 248. The amount of the area of edge catch 242b which is in contact with liner board 210 is greater than that of catch 242a and therefore, the holding power of catch 242b is increased when liner board 210 is larger or constructed from a heavier material, for example.

Figure 54:
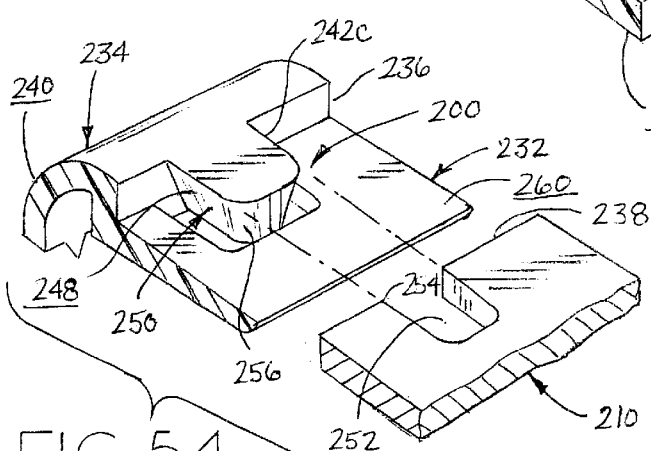
FIG. 54 is a fragmentary perspective view of a third embodiment of a liner board interlocking mechanism.
Figure 55:
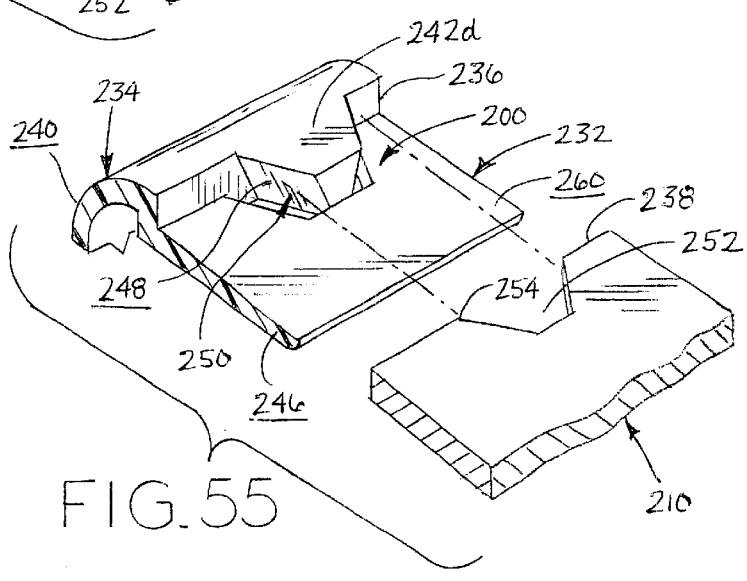
FIG. 55 is a fragmentary perspective view of a fourth embodiment of a liner board interlocking mechanism.

Referring to FIG. 54, edge catch 242c is a third embodiment of liner board interlocking mechanism 200 and is similar to edge catch 242b. Outermost corners 256 of edge catch 242c are rounded rather than sharply pointed as with edge catch 242b. The rounded edges provide a better lead in for liner board 210 during assembly with bead member section 212. The rounded corners 256 allow notch 252 to engage edge catch 242b without having to first be compressed. Comers 254 of liner board 210 are compressed by edge catch 242c once notch 252 and corners 254 are assembled beyond rounded corners 256. This makes assembly of foundation halves 206, 208 easier and more efficient than with the embodiment of FIG. 53.

A fourth embodiment of liner board interlocking mechanism 200 includes edge catch 242d similar to edge catches 242b and 242c. Edge catch 242d has a keystone shape which is advantageous in that it better accommodates variations in thickness of liner board 210 and the height of stepped portion 236.

Integrally formed with bead member section 212 is upholstery cover retention assembly 202 which is used to secure upholstery cover 50 to foundation 204 without the use of adhesive. These embodiments reduce the amount of sagging and wrinkling in upholstery cover 50 and also eliminate manufacturing steps.

In a first embodiment illustrated in FIGS. 37–42, upholstery cover retention assembly 202a includes retention channel 258. Retention channel 258 is defined by walls 262, 264 which are arranged substantially perpendicular on flat elongated portion 232 of bead member section 212. Located within retention channel 258 are a plurality of barbs 266 integrally formed with wall 264 and extending into channel 258. Barbs 266 are spaced along retention channel 258 to grasp upholstery cover 50 when inserted into channel 258.

Figure 40:
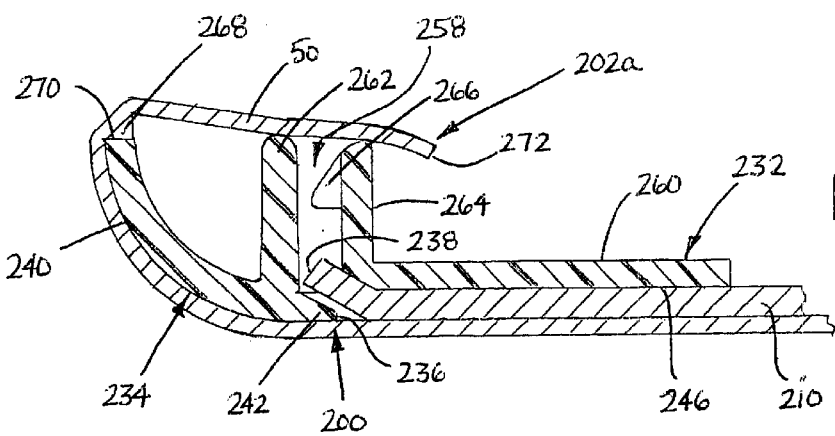
FIG. 40 is a fragmentary sectional view of one foundation half of FIG. 38.
Figure 41:
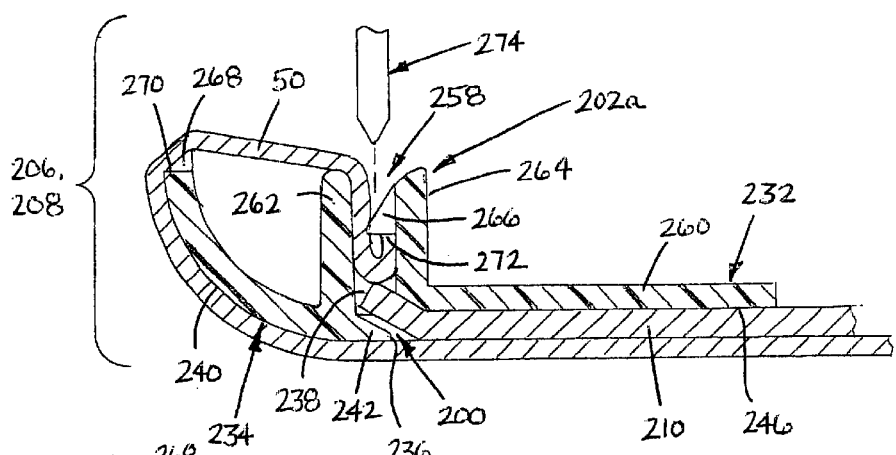
FIG. 41 is a fragmentary sectional view of the foundation half of FIG. 38 showing the use of an installation tool to secure the upholstery cover in the upholstery cover retention assembly.
Figure 42:
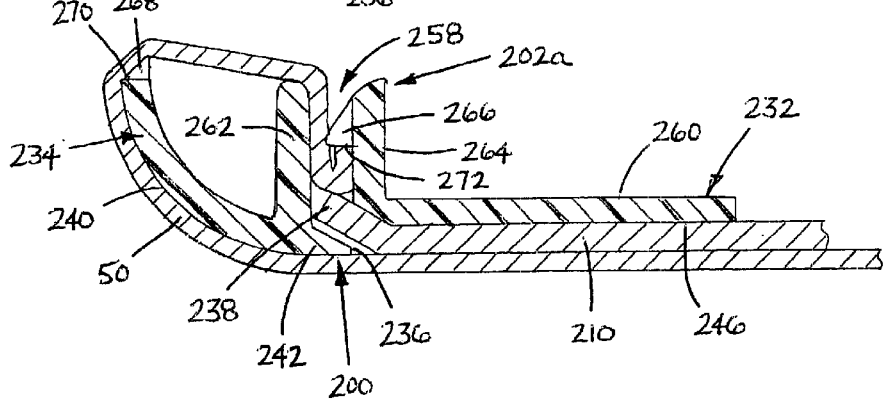
FIG. 42 is a fragmentary sectional view of the foundation half of FIG. 38 showing the upholstery cover secured to the foundation half.

The method of assembly is as follows. Upholstery cover 50 is first engaged by a plurality of barbs 268 spaced along edge 270 of rounded edge portion 234 as one elongated edge 272 of upholstery cover 50 is wrapped around rounded edge portion 234 of one of foundation halves 206, 208 (FIG. 40). Edge 272 of upholstery cover 50 is then stretched over the top of retention channel 258 of one of foundation halves 206, 208. Installation tool 274 is positioned above retention channel 258 and is then moved into channel 258, forcing edge 272 of upholstery cover 50 into channel 258. Edge 272 of upholstery cover 50 is captured within retention channel 258 between walls 262, 264, underneath barbs 266 (FIGS. 41 and 42). Upholstery cover 50 is stretched around edge member 216, covering liner board 210 of both foundation halves 206,208. Second elongated edge 272 of upholstery cover 50 is engaged by barbs 268 located along edge 270 of rounded edge portion 234 of the second of foundation halves 206, 208 and is secured within retention channel 258 thereof in the manner described above. Once edges 272 of upholstery cover 50 are secured within retention channels 258 located on each foundation half, 206, 208, foundation halves 206, 208 are secured to one another by engaging clip receivers 224 with clips 228 and clips 78 located on flat elongated portion 232 of bead member section 212. Clips 78 may be any of the embodiments described previously. When foundation halves 206, 208 are secured to one another, upholstery cover 50 is stretched causing barbs 266 and 268 to more securely engage upholstery cover 50.

Figure 43:
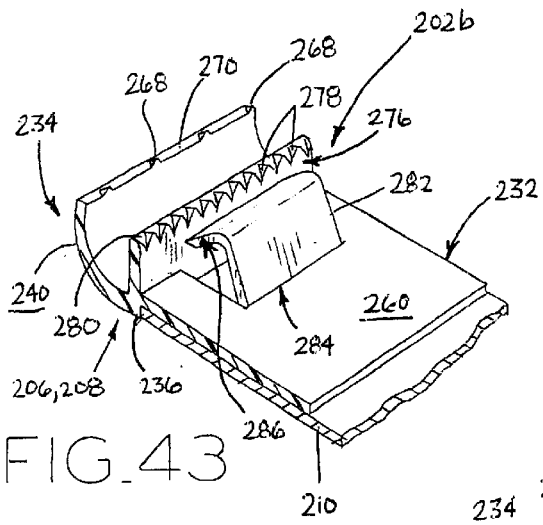
FIG. 43 is a fragmentary perspective view of a foundation half of the sun visor assembly showing a second embodiment of an upholstery cover retention assembly.
Figure 47:
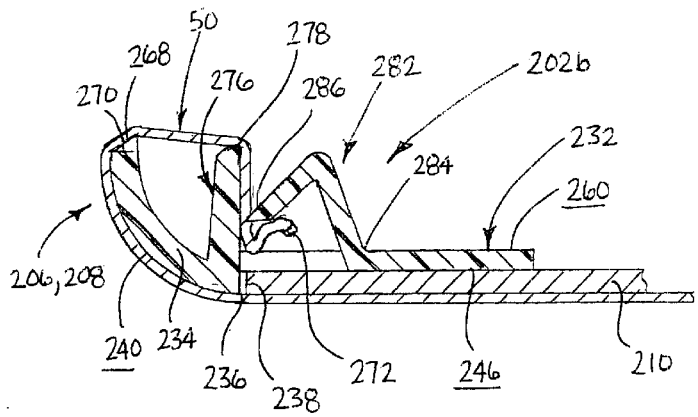
FIG. 47 is a side view of the sun visor assembly of FIG. 43 showing an upholstery cover secured to the foundation half.

Upholstery cover retention assembly 202b is illustrated in FIGS. 43 and 47 and is provided with wall 276 upstanding substantially perpendicular from interior surface 260 of bead member section 212. A plurality of barbs 278 are located along the upper edge 280 of wall 276. Extending upwardly from interior surface 260 of bead member section 212 is catch 282. Catch 282 is substantially V-shaped having end 284 integrally formed with flat elongated portion 232 and sharply pointed free end 286 to engage upholstery cover 50.

Upholstery cover 50 is wrapped around the exterior surface of liner board 210 and rounded edge portion 234 of bead member section 212 until it is engaged by edge catches 268 located along edge 270. One edge 272 of upholstery cover 50 is then wrapped over wall 276 being caught by barbs 278. Catch 282 is flexible such that when free end 286 is pulled away from wall 276, edge 272 of upholstery cover 50 may be positioned underneath end 286 of catch 282. When catch 282 is released, free end 286 engages upholstery cover 50, pulling it taught as catch 282 is lowered. The second edge 272 of upholstery cover 50 is wrapped around edge member 216 and the second of foundation halves 206, 208 to be secured to bead member section 212 thereof. Foundation halves 206, 208 are then secured to one another in the manner described above.

Figure 44:
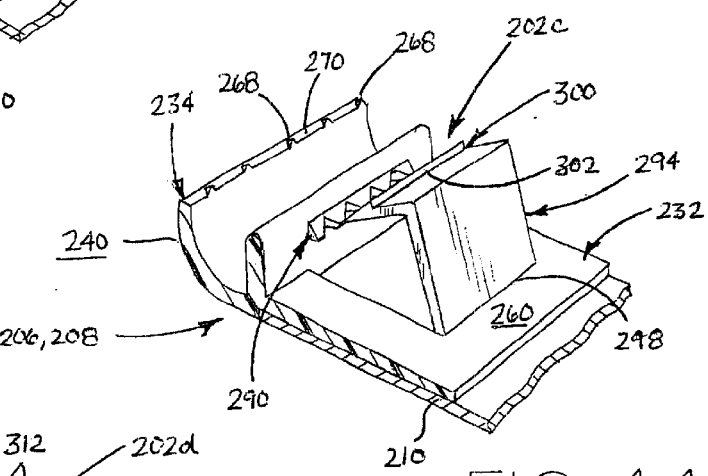
FIG. 44 is a fragmentary perspective view of a foundation half of the sun visor assembly showing a third embodiment of an upholstery cover retention assembly.
Figure 48:
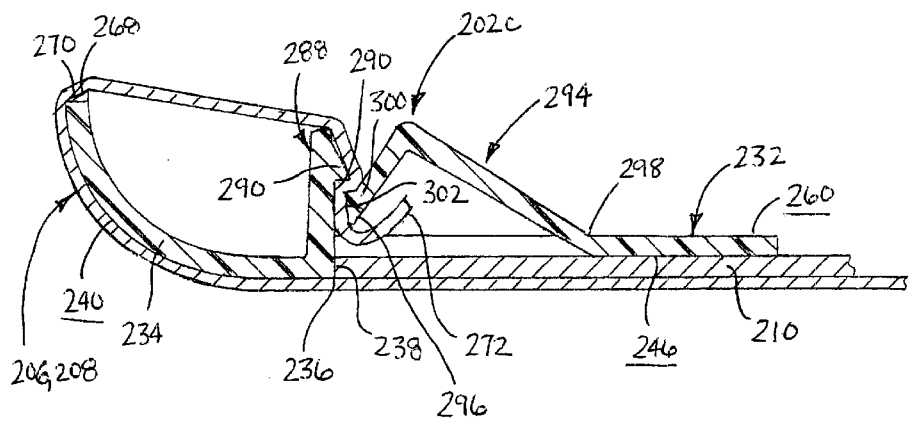
FIG. 48 is a side view of the sun visor assembly of FIG. 44 showing an upholstery cover secured to the foundation half.

Referring to FIGS. 44 and 48, upholstery cover retention assembly 202c is a third embodiment of upholstery cover retention assembly 202. Upholstery cover retention assembly 202c includes wall 288 similar to wall 276 of retention assembly 202b. Located along a portion of wall 288 are barbs 290 having hook portion 292. Catch 294 is a substantially V-shaped locking catch having end 296 integrally formed with flat elongated portion 232 and free end 298. Formed at free end 298 of locking catch 294 is barb 300 having hook portion 302 complementary to hook portion 292. Hook portion 302 locks beneath hook portion 292, capturing upholstery cover 50 therebetween and securing upholstery cover 50 over wall 288.

In assembling the visor, locking catch 294 formed on bead member section 212 of one of foundation halves 206, 208 is pulled away from wall 288. Edge 272 of upholstery cover 50 is positioned between wall 288 and locking catch 294 with edge 272 extending beneath locking catch 294. Locking catch 294 is forced downwardly until hook portion 302 of barb 300 snaps underneath hook portion 292 of barb 290 to secure upholstery cover 50 between wall 288 and locking catch 294. Upholstery cover 50 is wrapped around liner board 210 of the first of foundation halves 206, 208, edge member 216, and the second bead member section 212 to be secured to upholstery cover retention assembly 202c of the second of foundation halves 206, 208.

Figure 45:
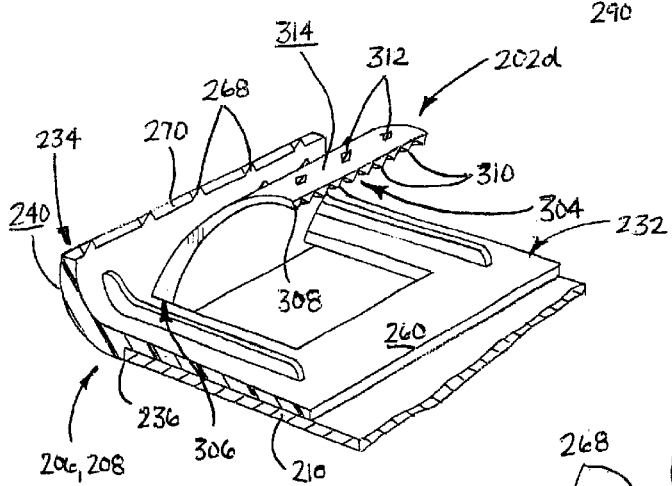
FIG. 45 is a fragmentary perspective view of a foundation half of the sun visor assembly showing a fourth embodiment of an upholstery cover retention assembly.
Figure 49:
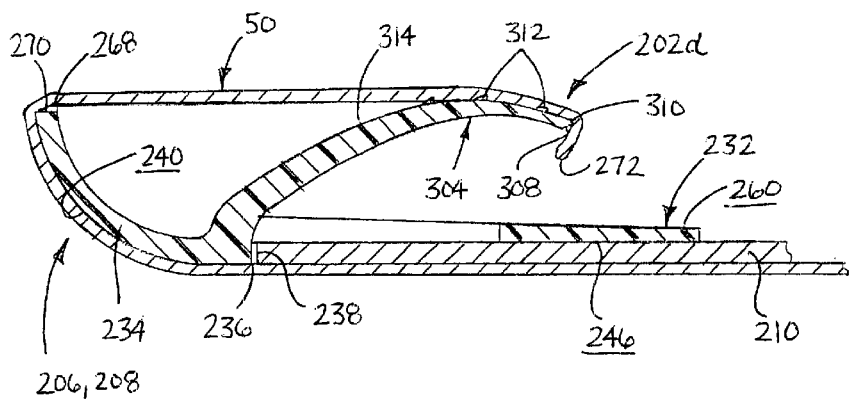
FIG. 49 is a side view of the sun visor assembly of FIG. 45 showing an upholstery cover secured to the foundation half.

Referring to FIGS. 45 and 49, upholstery cover retention assembly 202d is shown including flexible catch 304 which is arc shaped, extending away from rounded edge portion 234 and above edge 270 thereof. End 306 of catch 304 is secured to flat elongated portion 232 near rounded edge portion 234. Located along edge 308 of catch 304 are a plurality of barbs 310 with additional barbs 312 being spaced about upper surface 314 of catch 304.

In the assembly of the visor upholstery cover 50 is wrapped around the outer surface of rounded edge portion 234 of one of foundation halves 206, 208, over barbs 268. Edge 272 of upholstery cover 50 is then positioned over end 306 of catch 304 with barbs 310 and 312 engaging upholstery cover 50. Upholstery cover 50 is wrapped around liner board 210 of the first of foundation halves 206, 208, edge member 216, and bead member section 212 of the second of foundation halves 206, 208. The second edge 272 of upholstery cover 50 is engaged by barbs 268 of bead member section 212 and barbs 310 and 312 of catch 304. When foundation halves 206, 208 are secured to one another, catches 304 located on the respective foundation halves engage one another, forcing catches 304 away from one another toward the outer surface of visor assembly 74j. This stretches upholstery cover 50 until it is taught, thereby eliminating sags or wrinkles therein.

Figure 46:
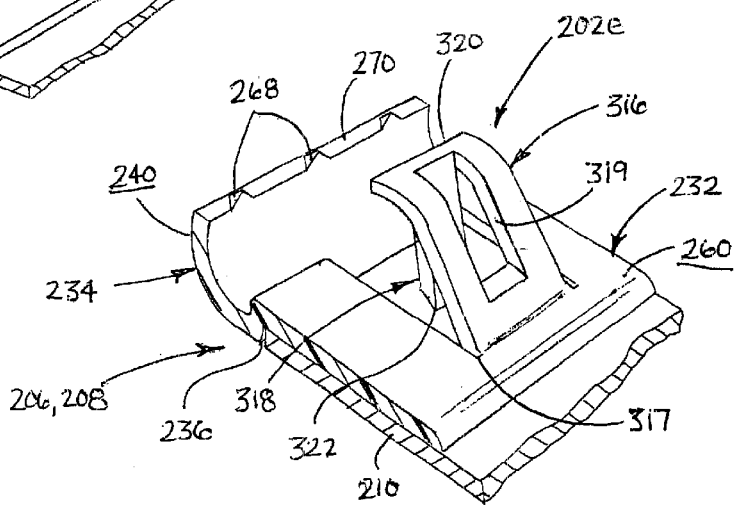
FIG. 46 is a fragmentary perspective view of a foundation half of the sun visor assembly showing a fifth embodiment of an upholstery cover retention assembly.
Figure 50:
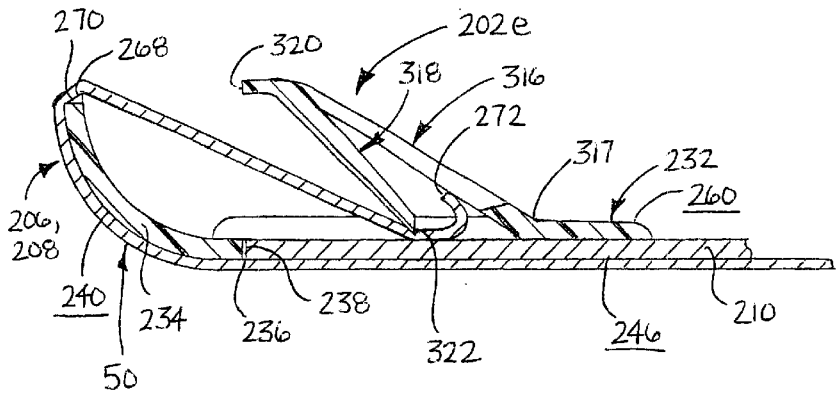
FIG. 50 is a side view of the sun visor assembly of FIG. 46 showing an upholstery cover secured to the foundation half.

Referring to FIGS. 46 and 50, a fifth embodiment of upholstery cover retention assembly 202 is illustrated. Upholstery cover retention assembly 202e includes flexible catch 316 having end 317 integrally attached to flat elongated portion 232 and free end 320. Flexible catch 316 which has opening 319 also includes second catch portion 318 which is connected to flexible catch 316 and extending substantially downward from free end 320 of catch 316. Barbed end 322 is located at free end 320 of second catch portion 318 to engage upholstery cover 50 as will be described hereinbelow.

In the assembly of the visor upholstery cover 50 is wrapped around rounded edge portion 234 of one of foundation halves 206, 208 and engages barbs 268. Flexible catch 316 is raised away from flat elongated portion 232 and one edge 272 of upholstery cover 50 is positioned underneath barbed end 322 of second catch portion 318. Similarly to upholstery cover retention assembly 202d, flexible catch 316 extends above barbs 268 such that when foundation halves 206, 208 are secured to one another, flexible catches 318 contact one another, forcing catches 318 toward the outer surface of sun visor assembly 74. The movement of catches 318 forces barbed end 322 toward attached end 317 of flexible catches 318, thereby stretching upholstery cover 50 taught to remove sagging or wrinkles therein.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A sun visor comprising:

a foundation including two foundation halves, said foundation halves each including a liner board and a bead member section;

a liner board interlocking mechanism cooperatively joining said liner board to said bead member section;

a cover; and a cover retention assembly that secures said cover to said foundation.

2. The sun visor of claim 1, wherein said retention assembly comprises two retention members, one said retention member located on each said bead member section.

3. The sun visor of claim 2, wherein said retention members include a pair of walls, one of said walls having at least one barb formed thereon, said cover captured between said walls.

4. The sun visor of claim 1, wherein said bead member sections cooperate to define a rounded edge of said sun visor.

5. The sun visor of claim 1, wherein each of said bead member sections includes a flat portion and a rounded edge joined by a stepped portion.

6. The sun visor of claim 5, wherein said stepped portion is sized to provide a space between said flat portion and said rounded edge to accommodate the thickness of said liner board.

7. A sun visor comprising:

a foundation including two foundation halves, said foundation halves each including a liner board and a bead member section; and a liner board interlocking mechanism cooperatively joining said liner board to said bead member section.

8. A sun visor comprising:

a foundation including two foundation halves, said foundation halves each including a liner board and a connecting member disposed proximate an edge of said liner board, said connecting members of each foundation half being secured together;

a cover; and a cover retention assembly that secures said cover to said foundation.

9. The sun visor of claim 8, further including a liner board interlocking mechanism cooperatively joining said liner board to said connecting member.

10. The sun visor of claim 8, wherein said connecting member is a bead member section, said bead member sections cooperating to define a rounded edge of said sun visor.

* * * * *